United States Patent [19]
Faris

[11] Patent Number: 6,133,980
[45] Date of Patent: Oct. 17, 2000

[54] LIQUID CRYSTAL FILM STRUCTURES WITH PHASE-RETARDATION SURFACE REGIONS FORMED THEREIN AND METHODS OF FABRICATING THE SAME

[75] Inventor: Sadeg M. Faris, Pleasantville, N.Y.

[73] Assignee: Metrologic Instruments, Inc., Blackwood, N.J.

[21] Appl. No.: 08/743,293

[22] Filed: Nov. 4, 1996

Related U.S. Application Data

[63] Continuation-in-part of application No. 08/739,467, Oct. 29, 1996, Pat. No. 6,034,753, and application No. 08/550,022, Oct. 30, 1995, Pat. No. 5,691,789.

[51] Int. Cl.$^7$ .............................. G02F 1/13; G02F 1/1335
[52] U.S. Cl. .............................. 349/176; 349/98; 349/175
[58] Field of Search ................................ 349/98, 194, 75, 349/115, 175; 359/500; 347/176

[56] References Cited

U.S. PATENT DOCUMENTS

| | | | |
|---|---|---|---|
| 5,627,666 | 5/1997 | Sharp et al. | 349/74 |
| 5,691,789 | 11/1997 | Li et al. | 349/194 |
| 5,739,456 | 4/1998 | Broer et al. | 349/175 |
| 6,034,753 | 3/2000 | Li et al. | 349/194 |

*Primary Examiner*—William L. Sikes
*Assistant Examiner*—Toan Ton
*Attorney, Agent, or Firm*—Thomas J. Perkowski, Esq., P.C.

[57] ABSTRACT

Disclosed are liquid crystal (LC) phase-retarders and linear polarizers and methods and apparatus for making the same. The liquid crystal phase-retarder is realized by a liquid crystal film structure having one or more phase retardation regions formed therein. Each phase retardation region has an optical axis specified by the direction and depth of orientation of liquid crystal molecules along the surface of the liquid crystal film structure. The liquid crystal linear polarizer is realized by a liquid crystal film structure having a chiral phase region within which liquid crystal molecules are cholesterically ordered. One or more nematic phase regions are formed along the surface of the liquid crystal film structure within which liquid crystal molecules are oriented along a direction and to a surface depth sufficient to realize one or more phase retardation regions therein having optical axes along the direction of liquid crystal molecule orientation.

20 Claims, 27 Drawing Sheets

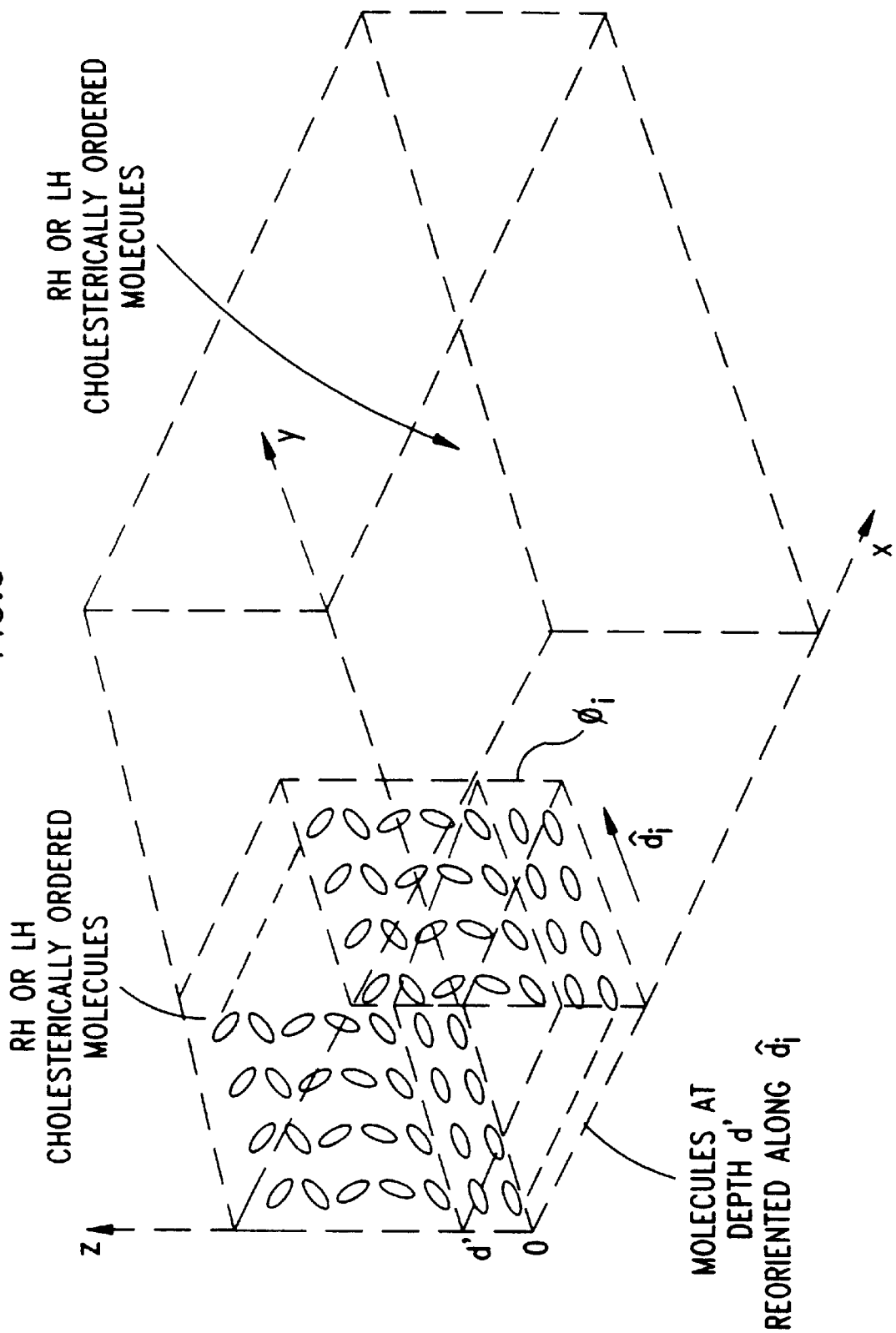

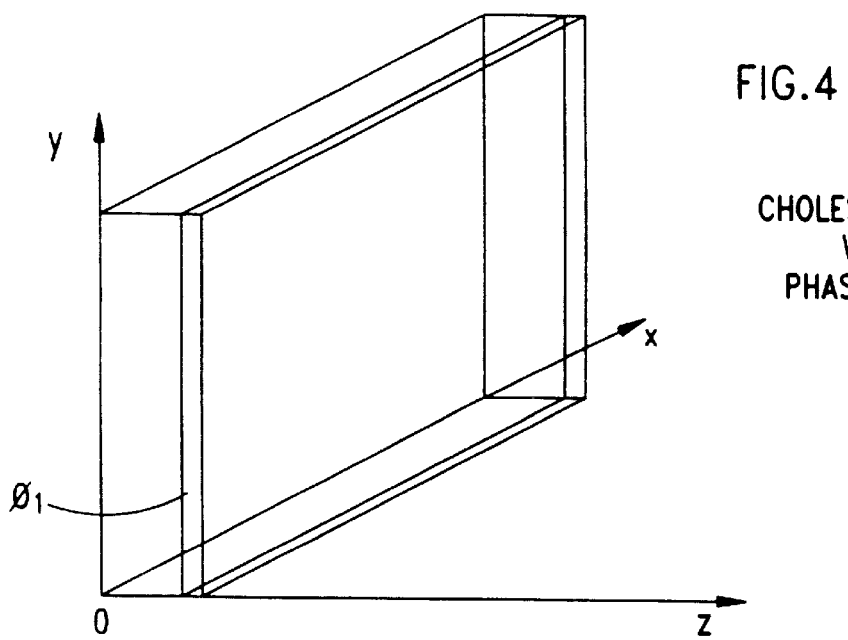
FIG. 4
CHOLESTERIC POLARIZER
WITH SINGLE
PHASE-RETARDATION
STRUCTURE
$\phi_1$
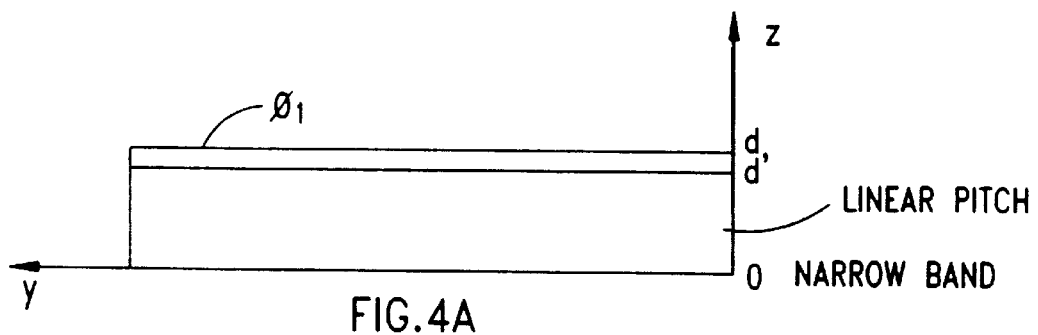
FIG. 4A
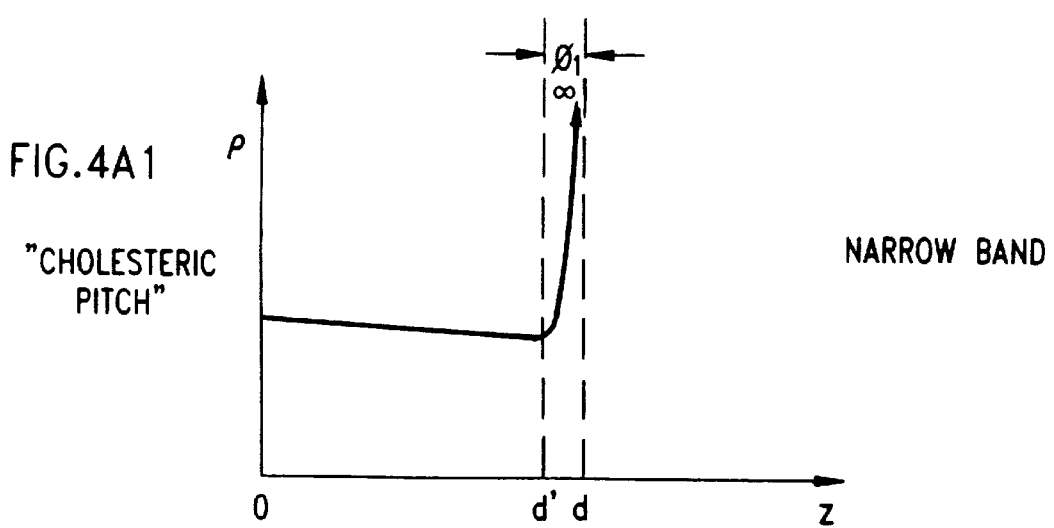
FIG. 4A1
"CHOLESTERIC PITCH"
NARROW BAND

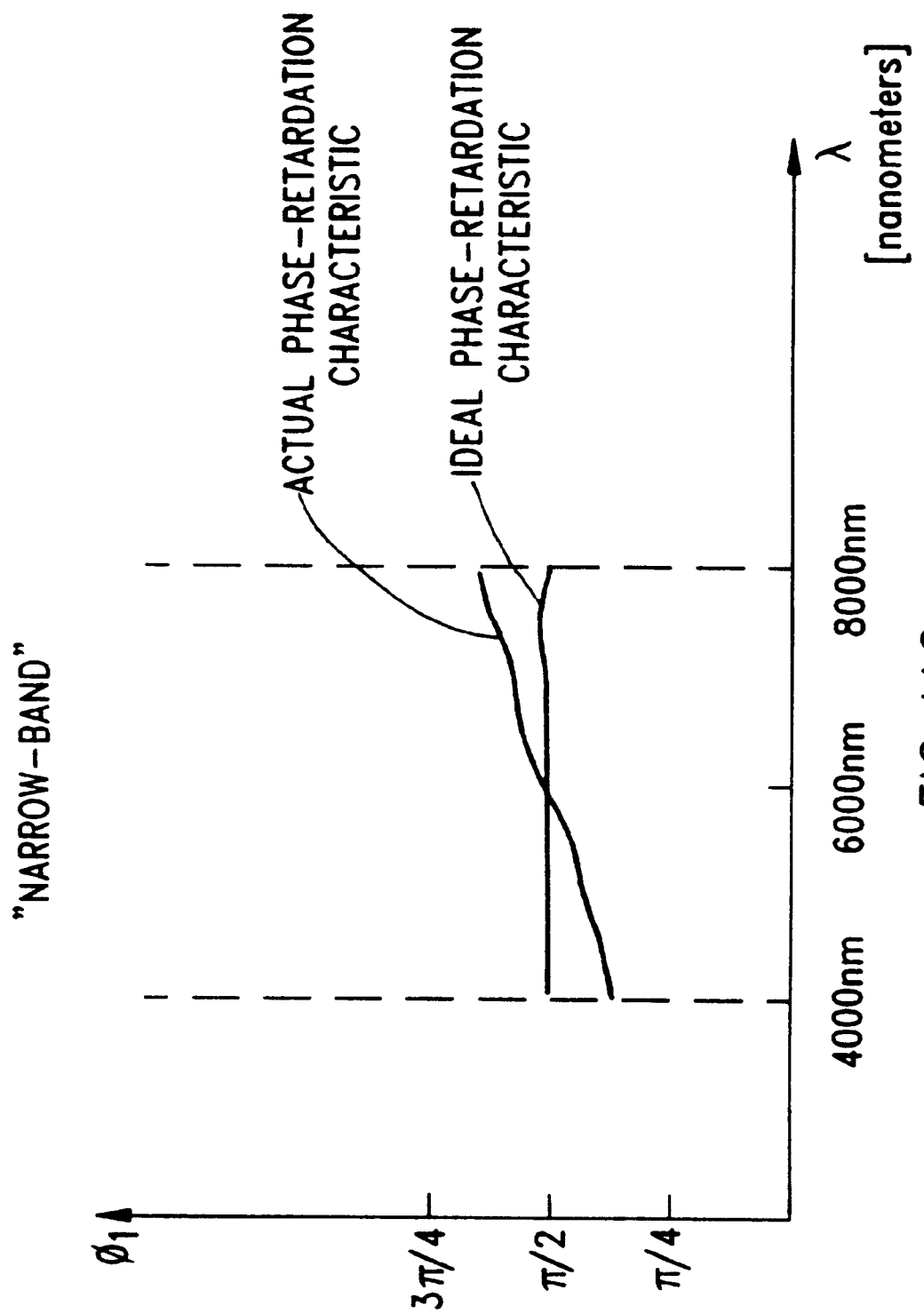
FIG.4A2

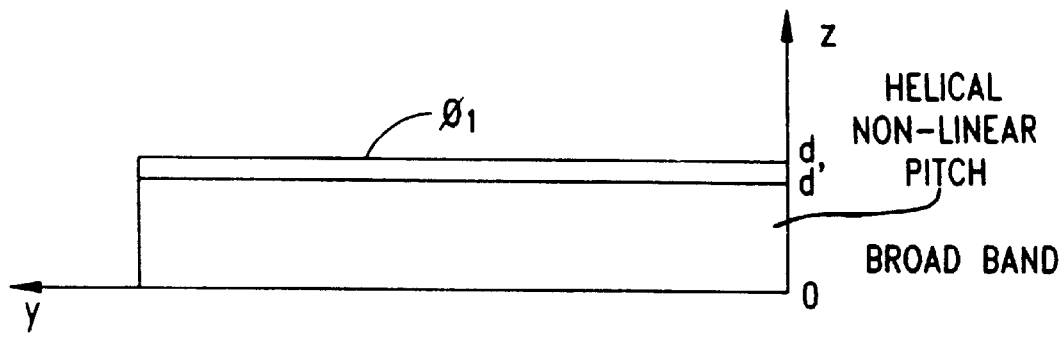
FIG.4B
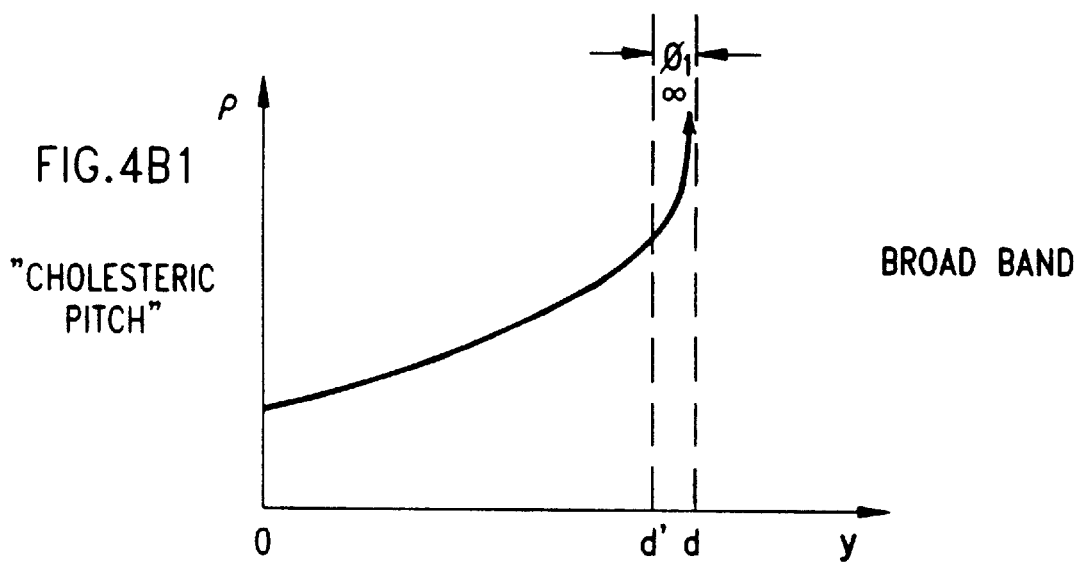
FIG.4B1
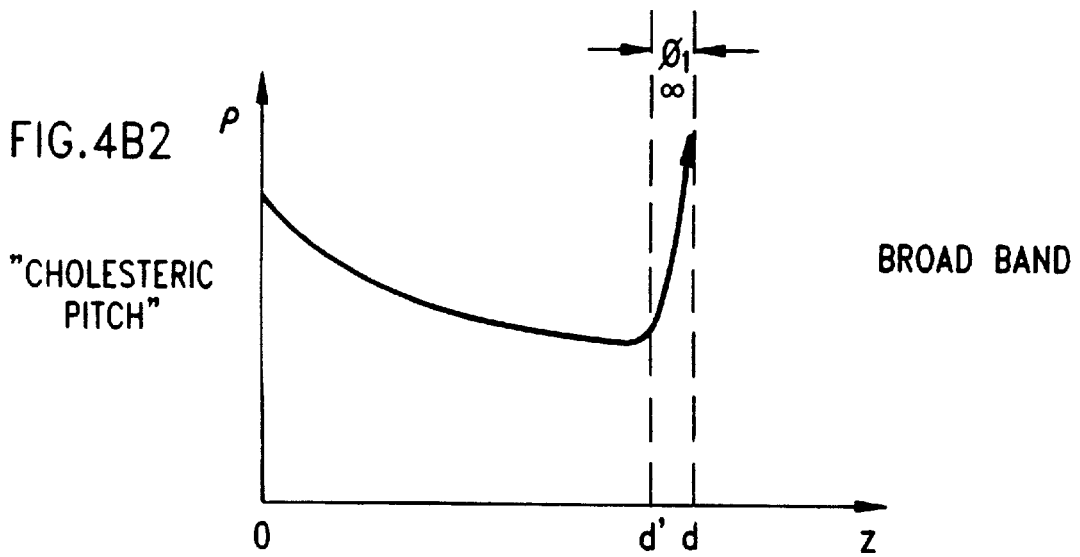
FIG.4B2

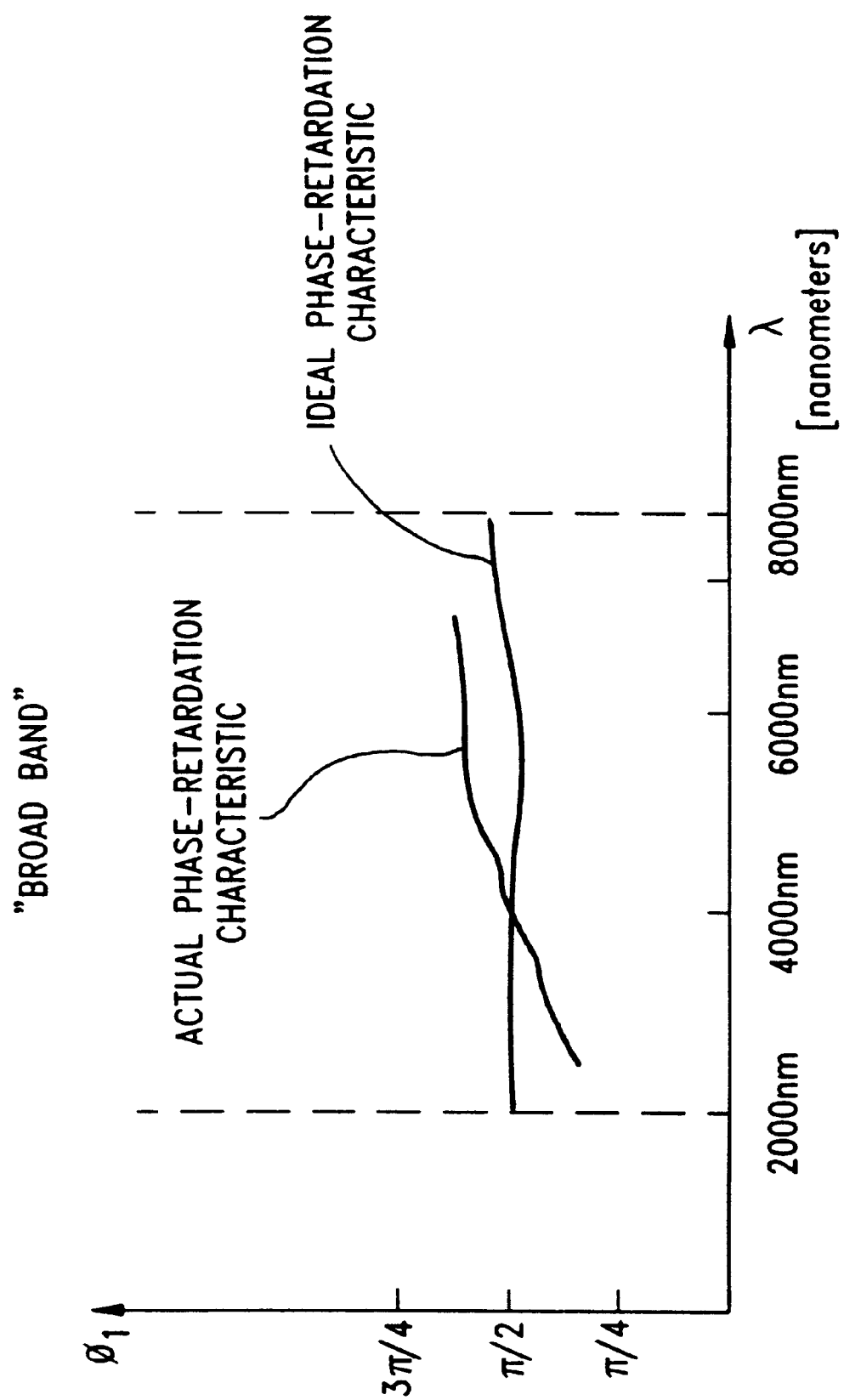
FIG.4B3

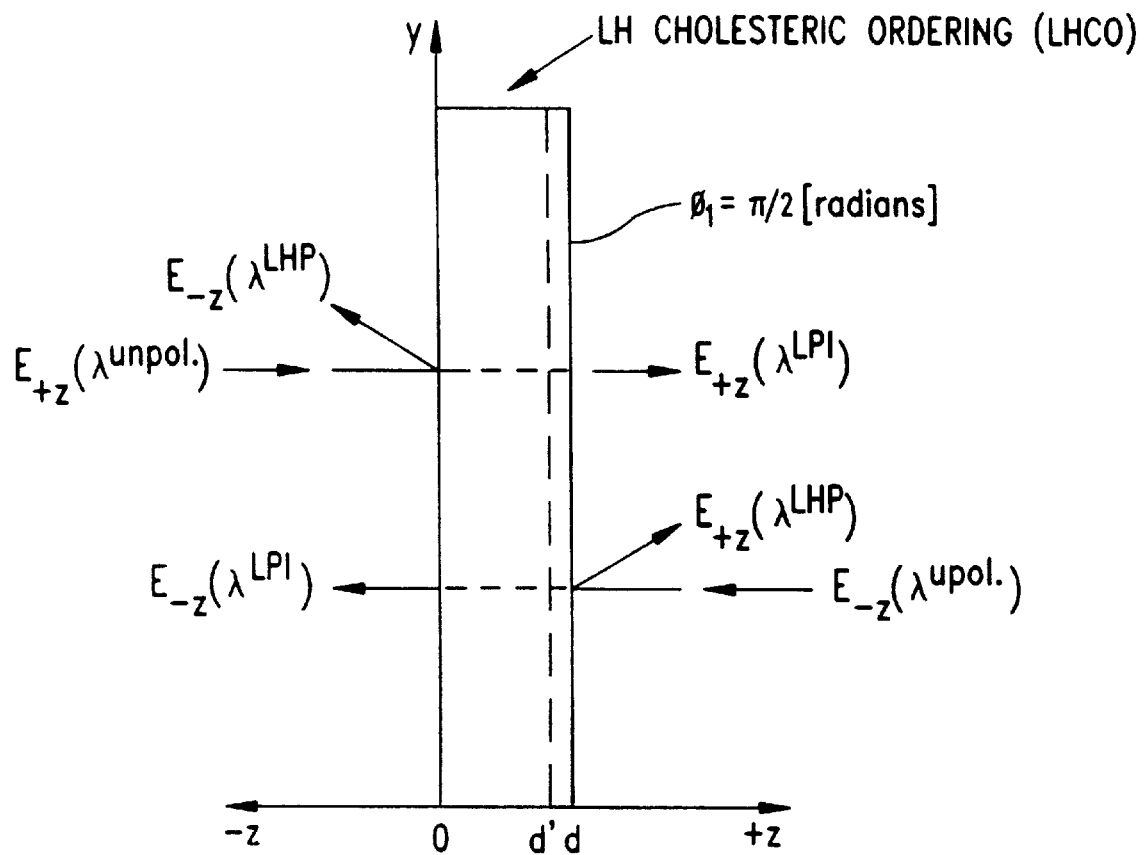
FIG.5A1
$$\overline{E}_{+z}(\lambda^{unpol.}) \; \square \; P(LHCO; \pi/2) \Longrightarrow E_{-z}(\lambda^{LHP}), E_{+z}(\lambda^{LPI})$$
$$E_{-z}(\lambda^{unpol.}) \; \square \; P(\pi/2; LHCO) \Longrightarrow E_{+z}(\lambda^{LHP}), E_{-z}(\lambda^{LPI})$$
FIG.5A2

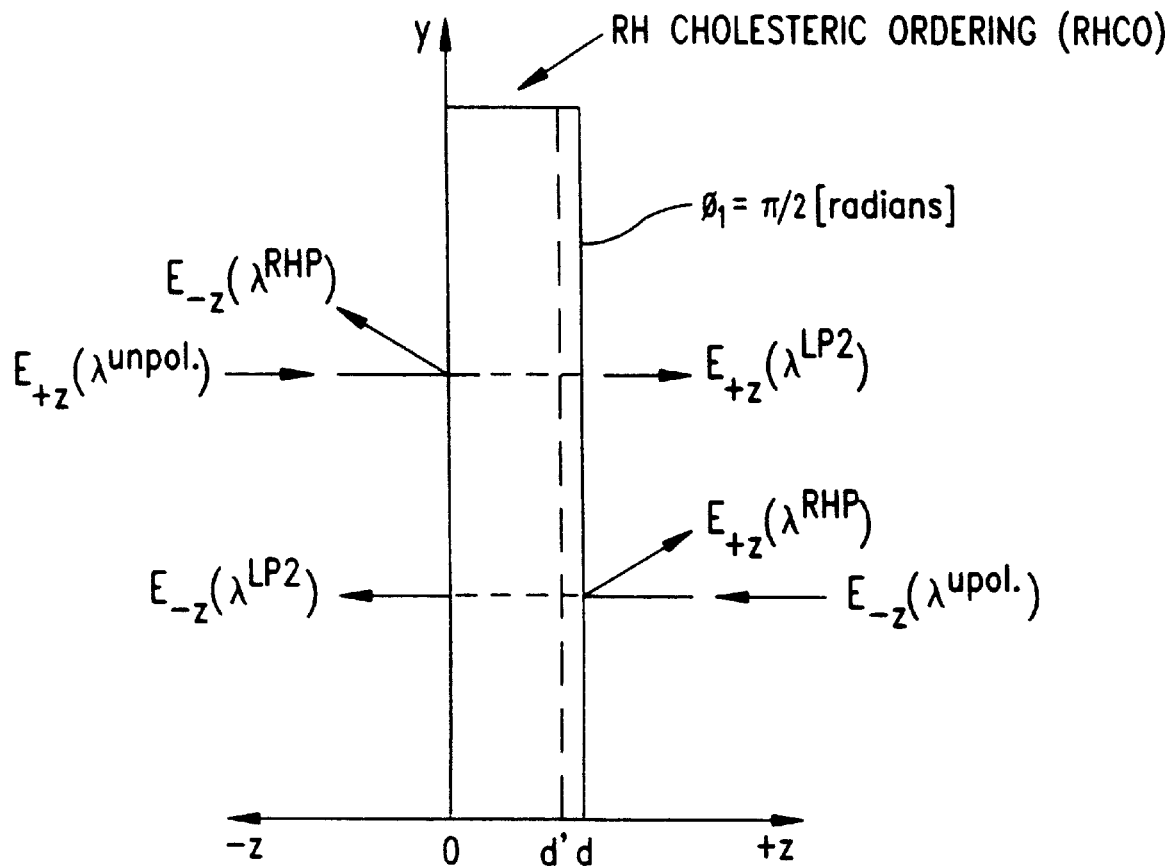
FIG.5B1
$$\overline{E}_{+z}(\lambda^{unpol.}) \; \square \; P(RHCO; \pi/2) \Longrightarrow E_{-z}(\lambda^{RHP}), E_{+z}(\lambda^{LP1})$$
$$E_{-z}(\lambda^{unpol.}) \; \square \; P(\pi/2; RHCO) \Longrightarrow E_{+z}(\lambda^{RHP}), E_{-z}(\lambda^{LP2})$$
FIG.5B2

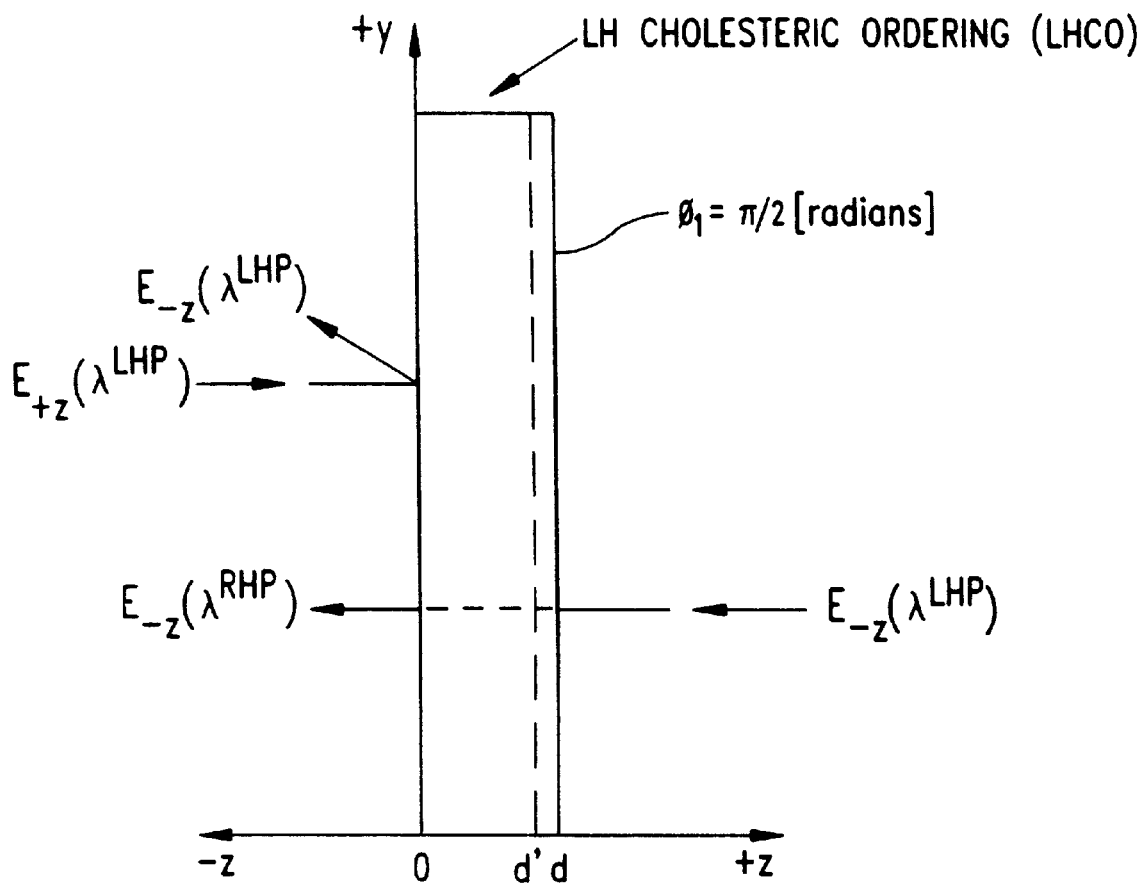

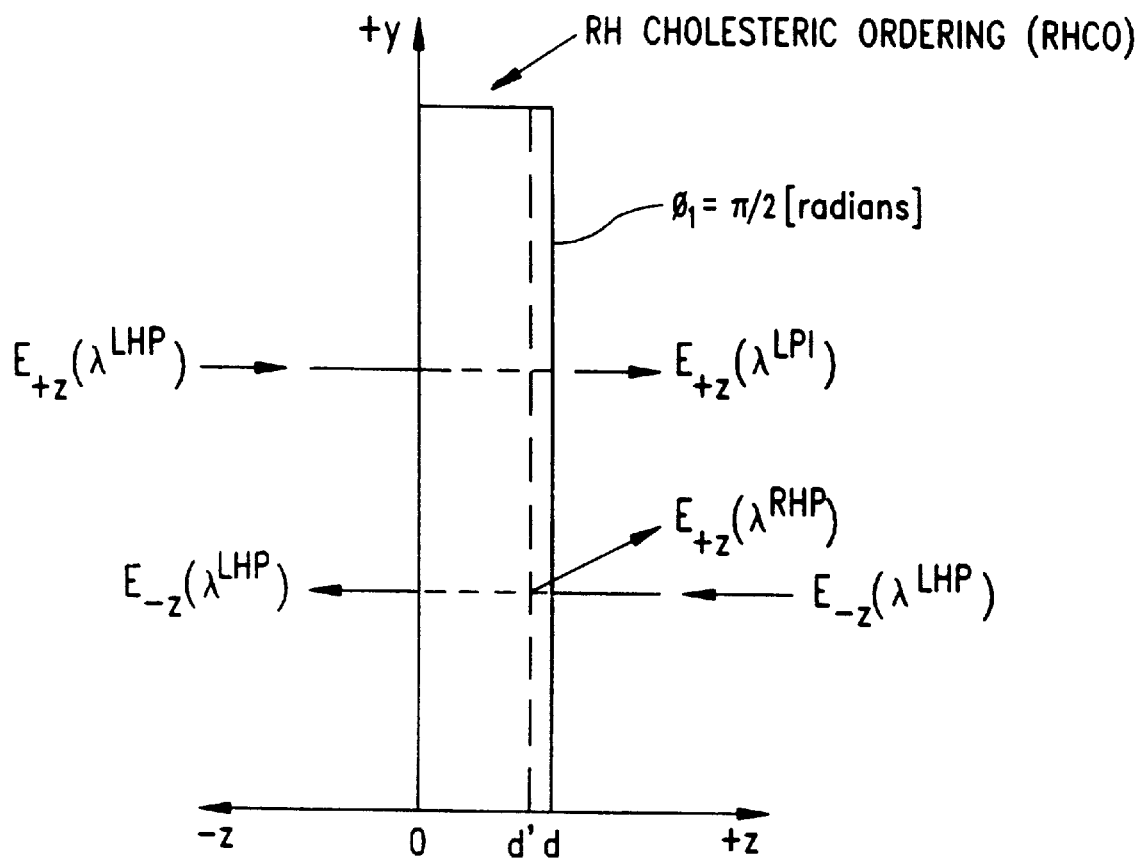
FIG.5D1
$$E_{+z}(\lambda^{LHP}) \;\square\; P(\pi/2;RHCO) \Longrightarrow E_{+z}(\lambda^{LPI})$$
$$E_{-z}(\lambda^{LHP}) \;\square\; P(RHCO;\pi/2) \Longrightarrow E_{+z}(\lambda^{RHP}), E_{-z}(\lambda^{LHP})$$
FIG.5D2

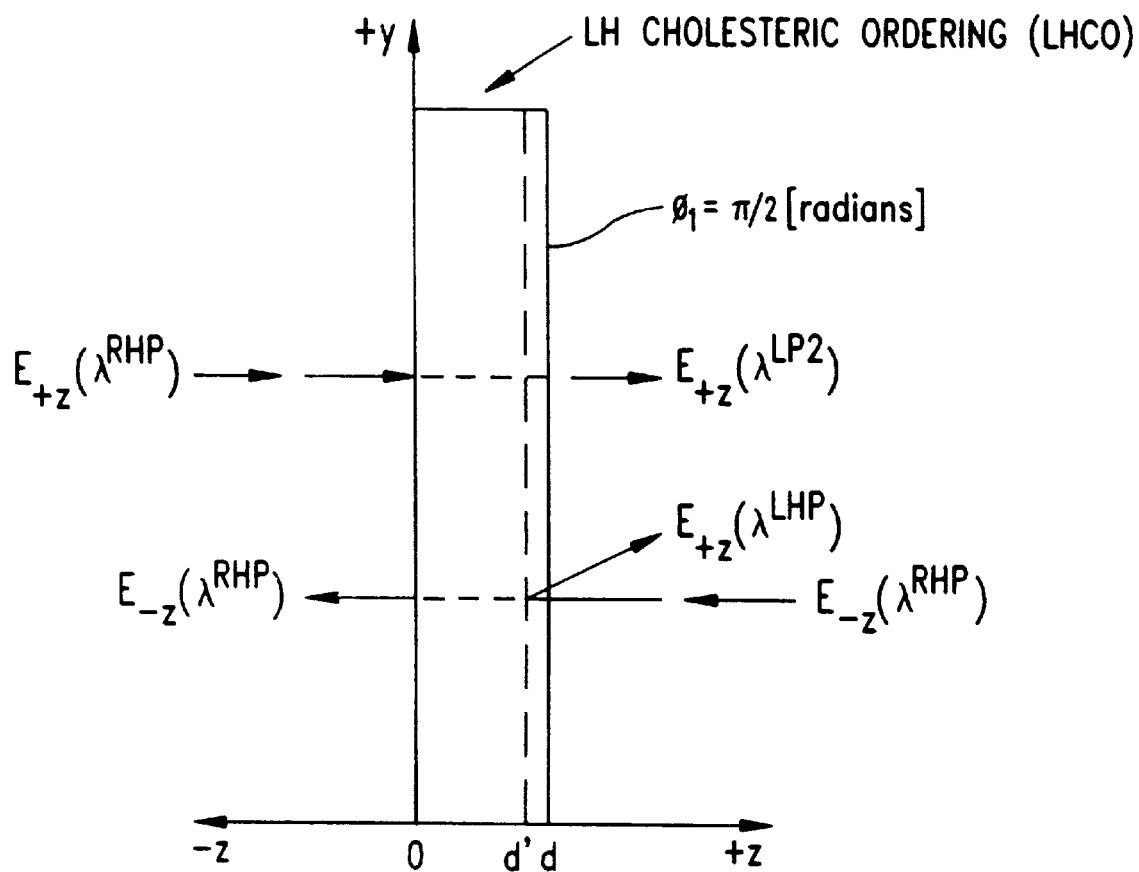
FIG.5E1
$$E_{+z}(\lambda^{RHP}) \; \square \; P(LHCO;\pi/2) \Longrightarrow E_{+z}(\lambda^{LP2})$$
$$E_{-z}(\lambda^{RHP}) \; \square \; P(\pi/2;LHCO) \Longrightarrow E_{+z}(\lambda^{LHP}), E_{-z}(\lambda^{RHP})$$
FIG.5E2

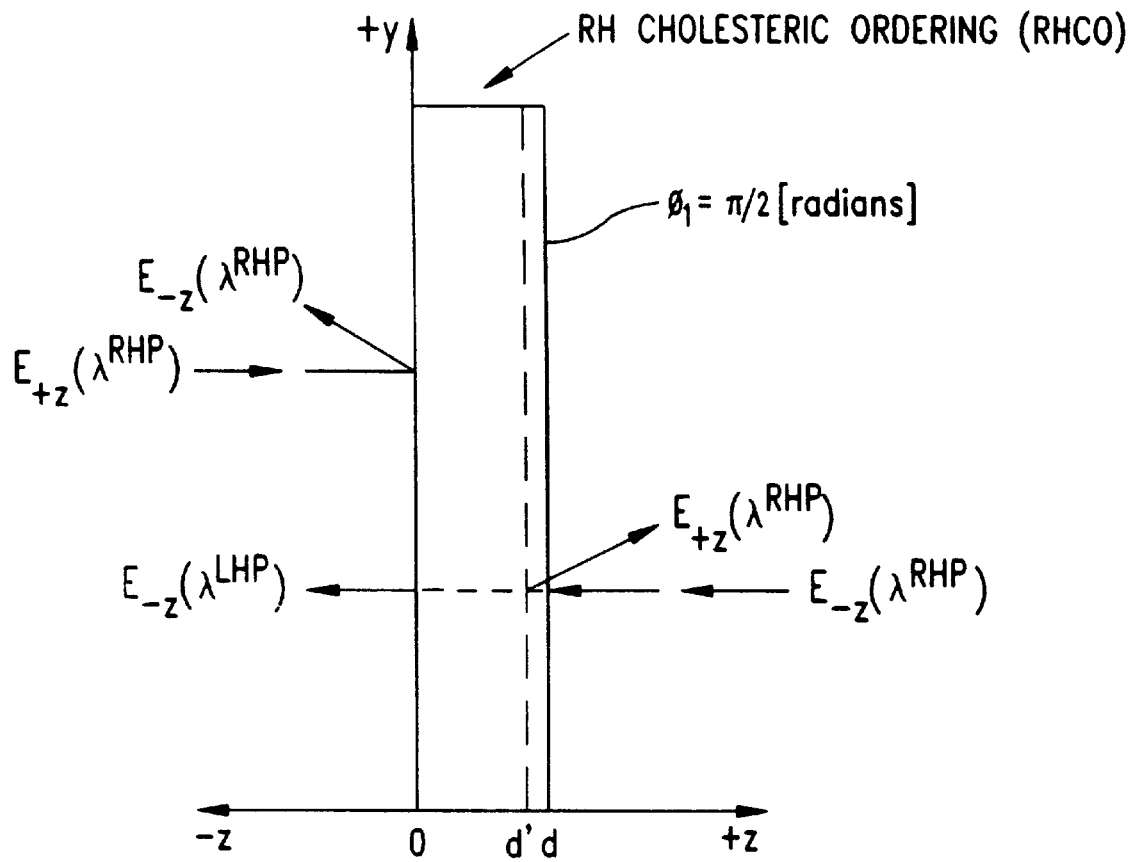
FIG.5F1
$$E_{+z}(\lambda^{RHP}) \; \Box \; P(RHCO; \pi/2) \Longrightarrow E_{-z}(\lambda^{RHP})$$
$$E_{-z}(\lambda^{RHP}) \; \Box \; P(\pi/2; RHCO) \Longrightarrow E_{+z}(\lambda^{RHP}), E_{-z}(\lambda^{LHP})$$
FIG.5F2

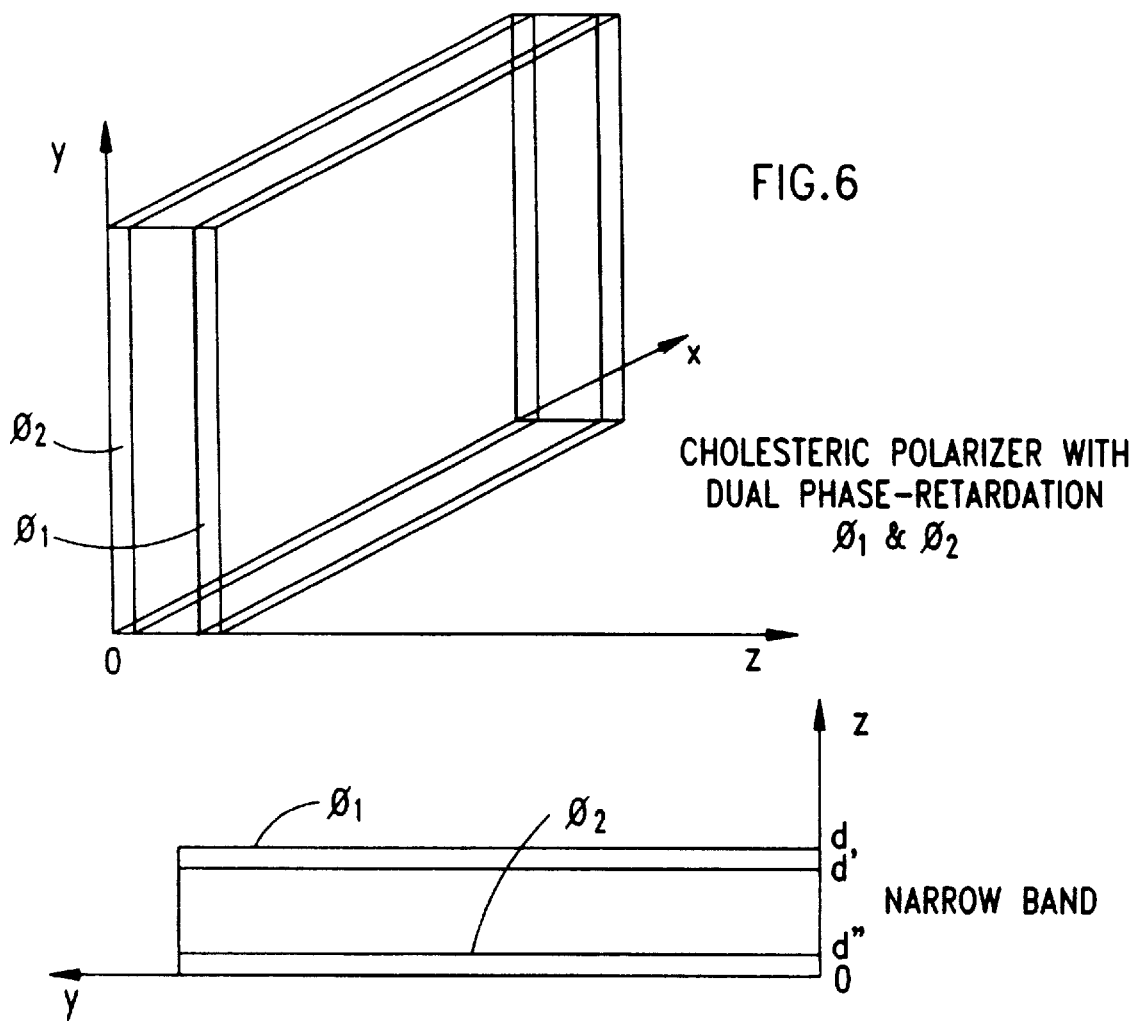
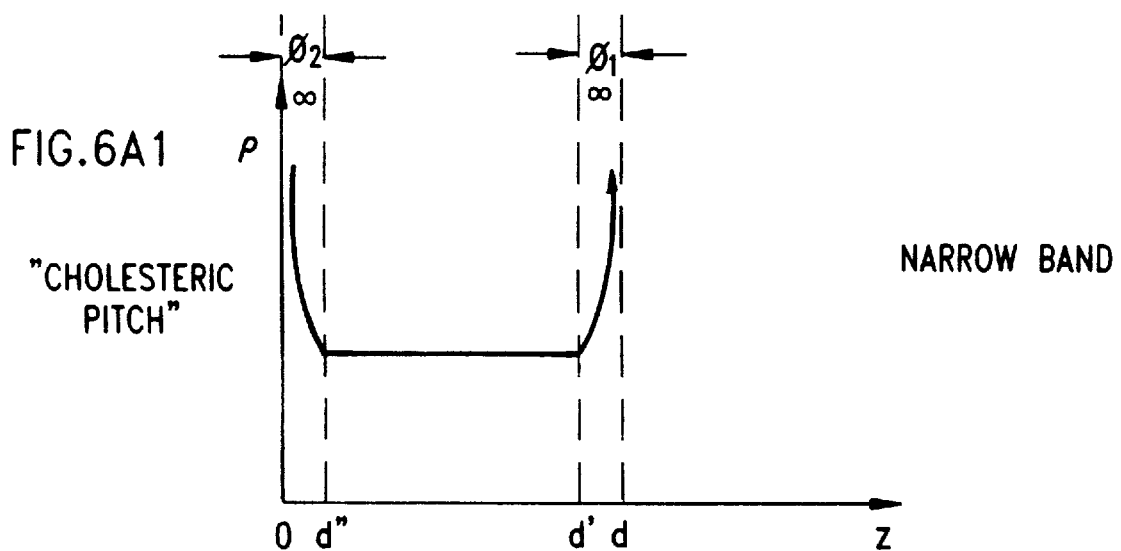

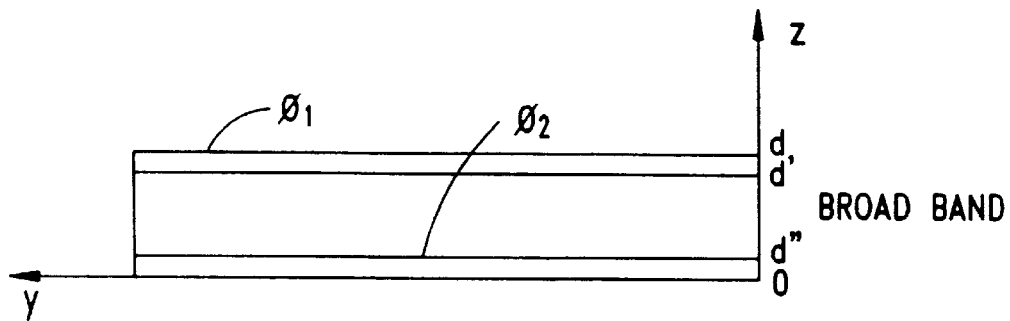
FIG.6B
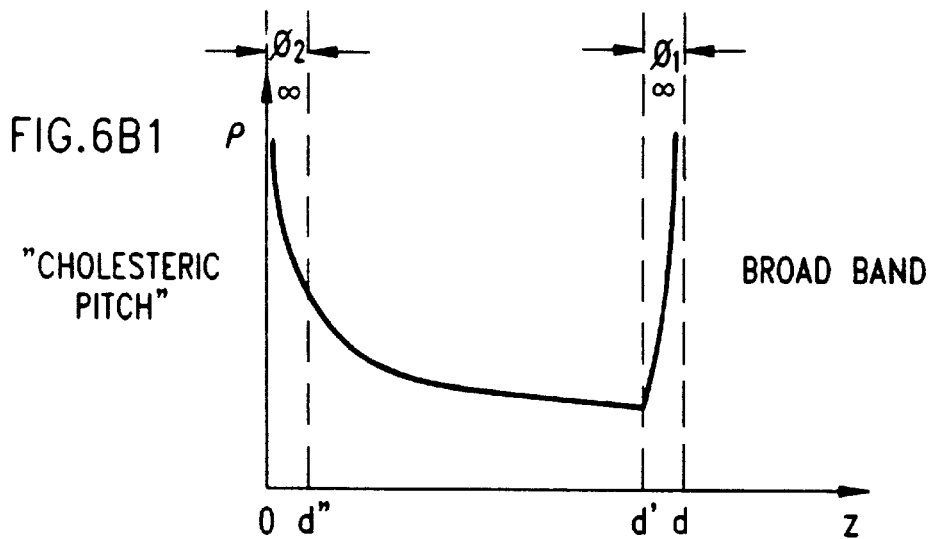
FIG.6B1
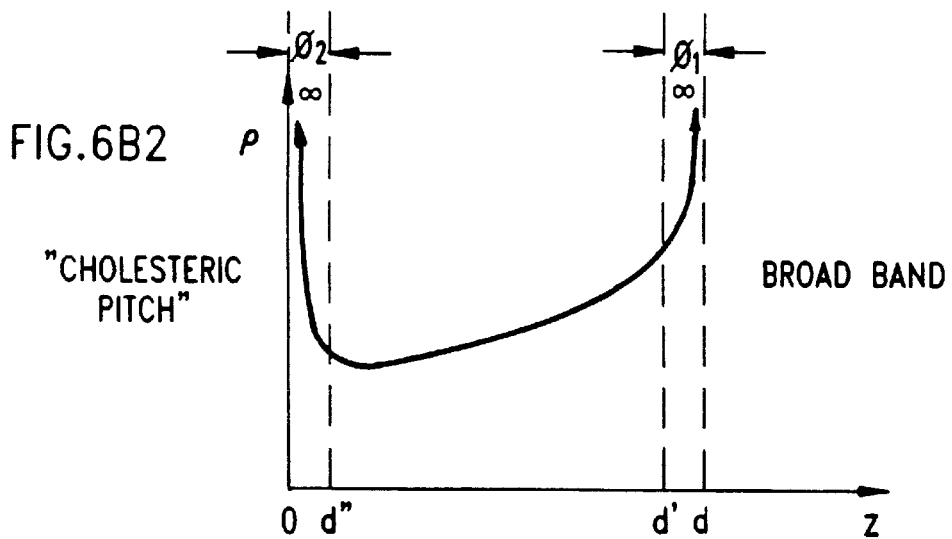
FIG.6B2

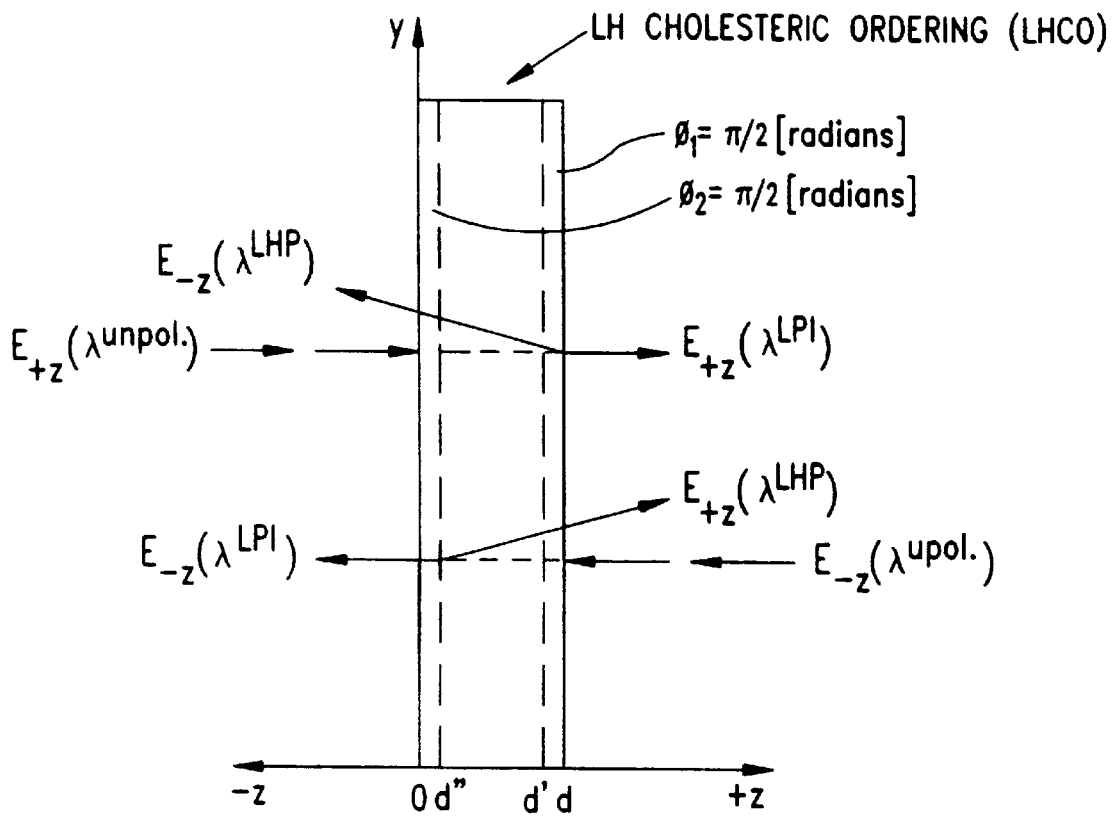
FIG.7A1
$$E_{+z}(\lambda^{unpol.}) \;\square\; P(\pi/2; LHCO; \pi/2) \Longrightarrow E_{-z}(\lambda^{LHP}), E_{+z}(\lambda^{LPI})$$
$$E_{-z}(\lambda^{unpol.}) \;\square\; P(\pi/2; LHCO; \pi/2) \Longrightarrow E_{+z}(\lambda^{LHP}), E_{-z}(\lambda^{LPI})$$
FIG.7A2

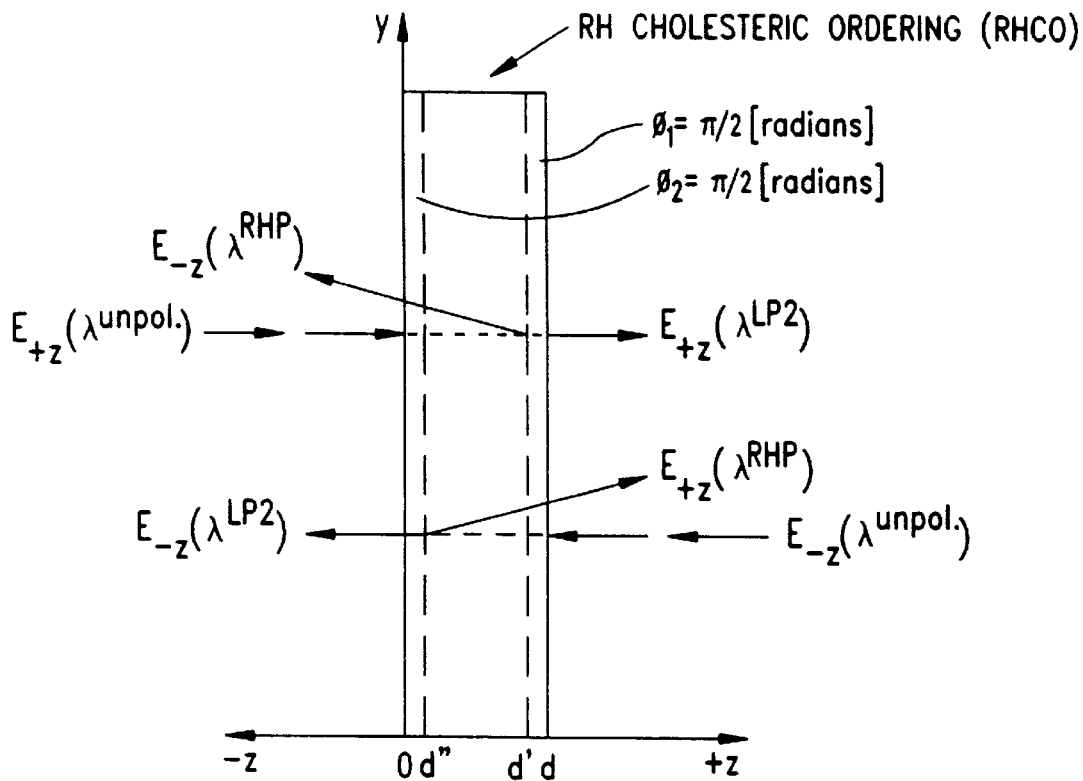
FIG.7B1
$$E_{+z}(\lambda^{unpol.}) \; \Box \; P(\pi/2;RHCO;\pi/2) \Rightarrow E_{-z}(\lambda^{RHP}), E_{+z}(\lambda^{LP2})$$
$$E_{-z}(\lambda^{unpol.}) \; \Box \; P(\pi/2;RHCO;\pi/2) \Rightarrow E_{+z}(\lambda^{RHP}), E_{-z}(\lambda^{LP2})$$
FIG.7B2

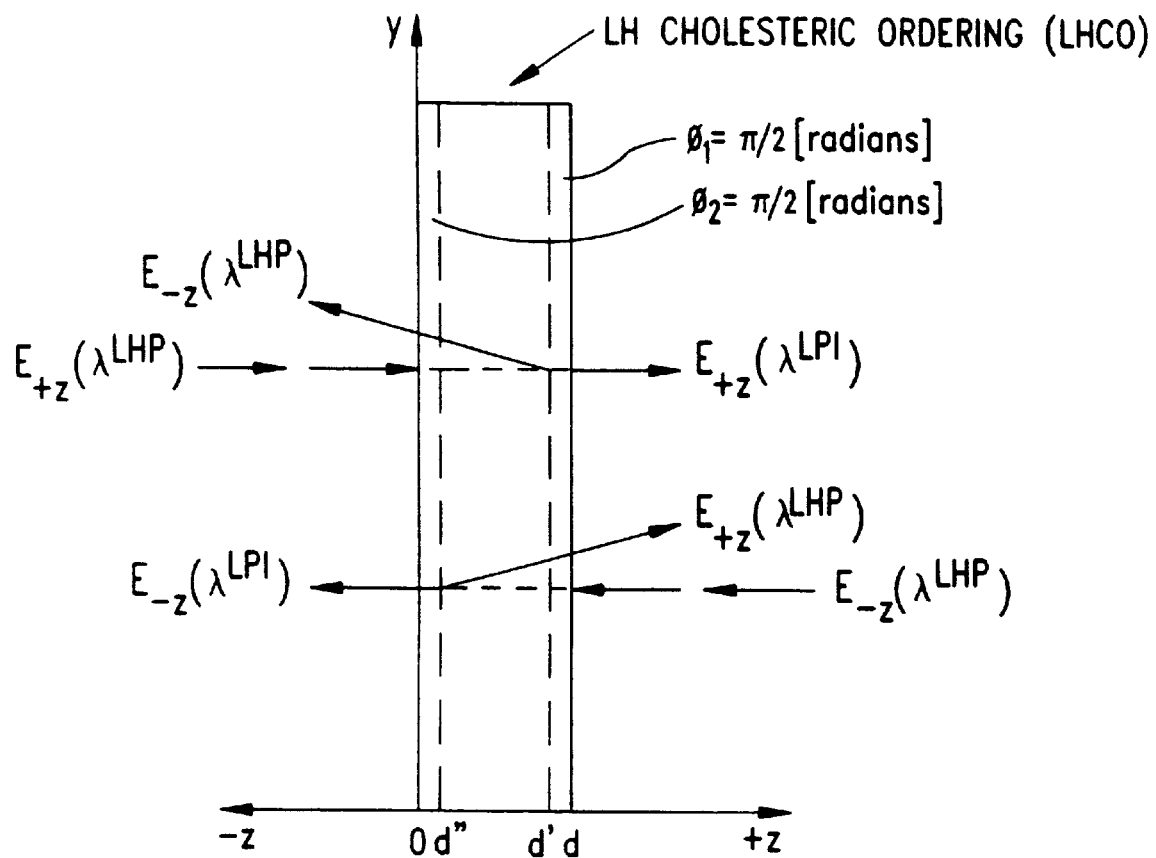
FIG.7C1
$$E_{+z}(\lambda^{LHP}) \; \square \; P(\pi/2; LHCO; \pi/2) \Rightarrow E_{-z}(\lambda^{LHP}), E_{+z}(\lambda^{LPI})$$
$$E_{-z}(\lambda^{LHP}) \; \square \; P(\pi/2; LHCO; \pi/2) \Rightarrow E_{+z}(\lambda^{LHP}), E_{-z}(\lambda^{LPI})$$
FIG.7C2

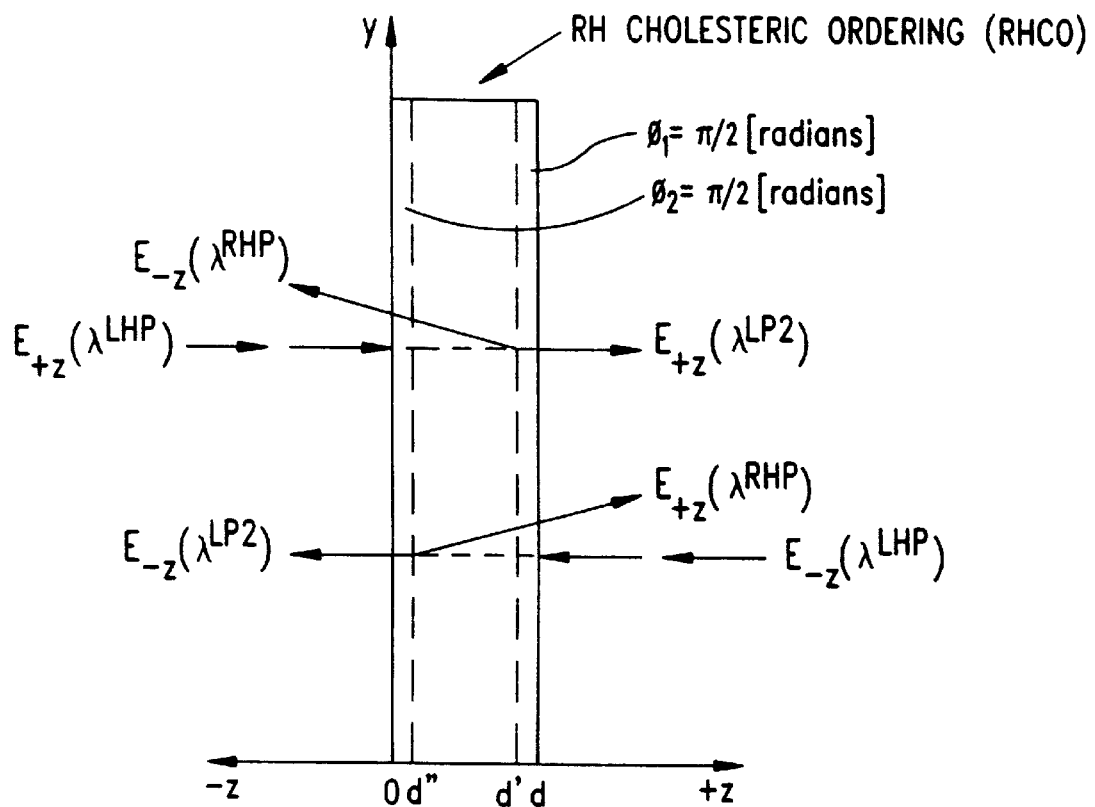
FIG.7D1
$$E_{+z}(\lambda^{LHP}) \; \square \; P(\pi/2; RHCO; \pi/2) \Longrightarrow E_{-z}(\lambda^{RHP}), E_{+z}(\lambda^{LP2})$$
$$E_{-z}(\lambda^{LHP}) \; \square \; P(\pi/2; RHCO; \pi/2) \Longrightarrow E_{+z}(\lambda^{RHP}), E_{-z}(\lambda^{LP2})$$
FIG.7D2

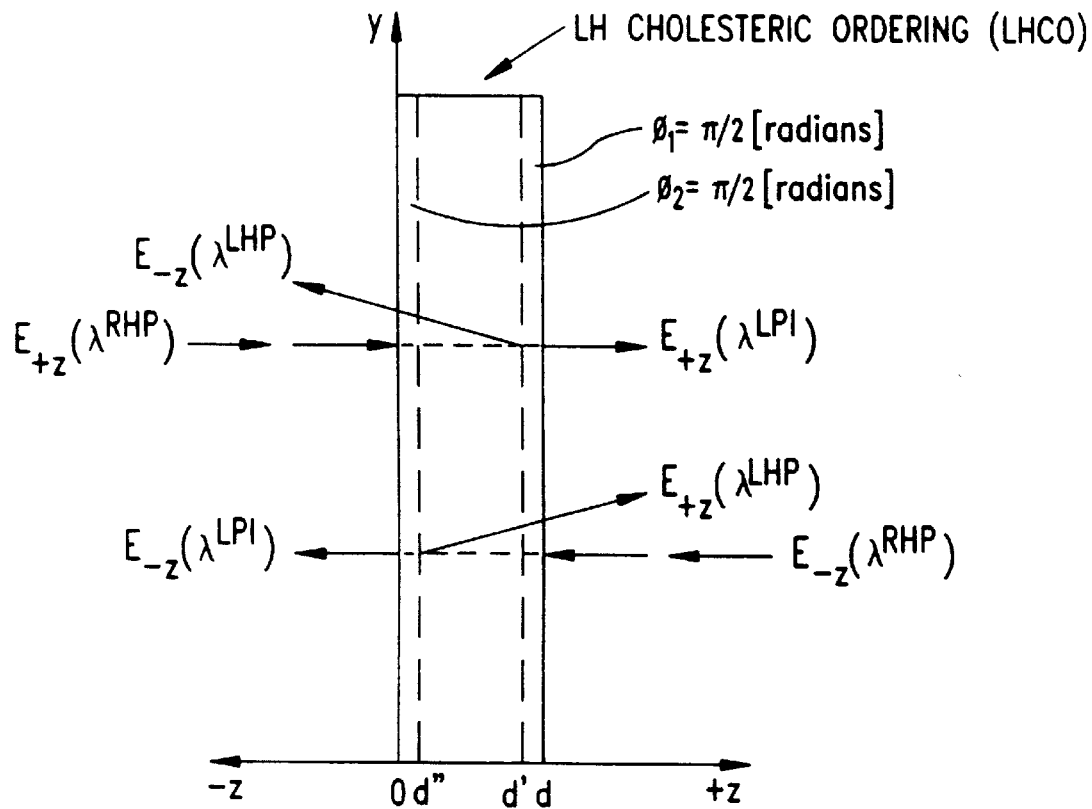
FIG.7E1
$$E_{+z}(\lambda^{RHP}) \;\square\; P(\pi/2;LHCO;\pi/2) \Rightarrow E_{-z}(\lambda^{LHP}), E_{+z}(\lambda^{LPI})$$
$$E_{-z}(\lambda^{RHP}) \;\square\; P(\pi/2;LHCO;\pi/2) \Rightarrow E_{+z}(\lambda^{LHP}), E_{-z}(\lambda^{LPI})$$
FIG.7E2

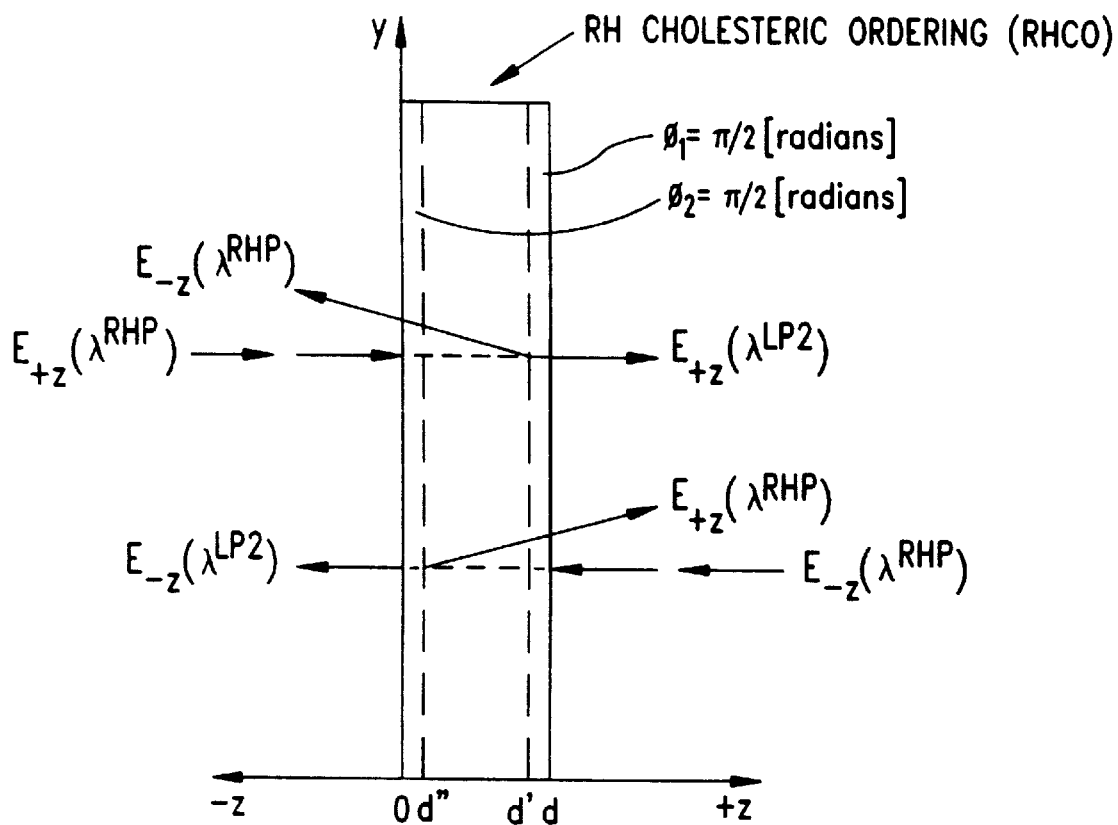
FIG.7F1
$$E_{+z}(\lambda^{RHP}) \;\square\; P(\pi/2; RHCO; \pi/2) \Longrightarrow E_{-z}(\lambda^{RHP}), E_{+z}(\lambda^{LP2})$$
$$E_{-z}(\lambda^{RHP}) \;\square\; P(\pi/2; RHCO; \pi/2) \Longrightarrow E_{+z}(\lambda^{RHP}), E_{-z}(\lambda^{LP2})$$
FIG.7F2

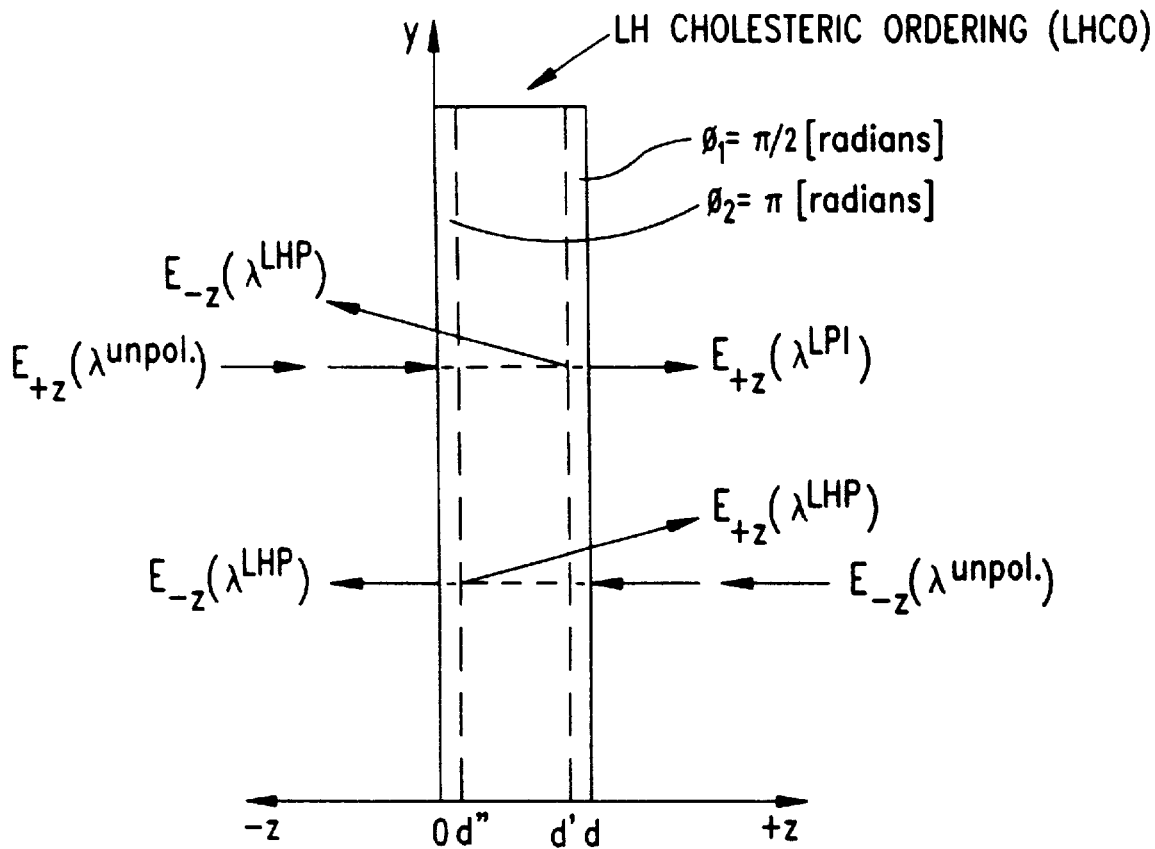
FIG.8A1
$$E_{+z}(\lambda^{unpol.}) \;\square\; P(\pi; LHCO; \pi/2) \Longrightarrow E_{-z}(\lambda^{LHP}), E_{+z}(\lambda^{LPI})$$
$$E_{-z}(\lambda^{unpol.}) \;\square\; P(\pi/2; LHCO; \pi) \Longrightarrow E_{+z}(\lambda^{LHP}), E_{-z}(\lambda^{LHP})$$
FIG.8A2

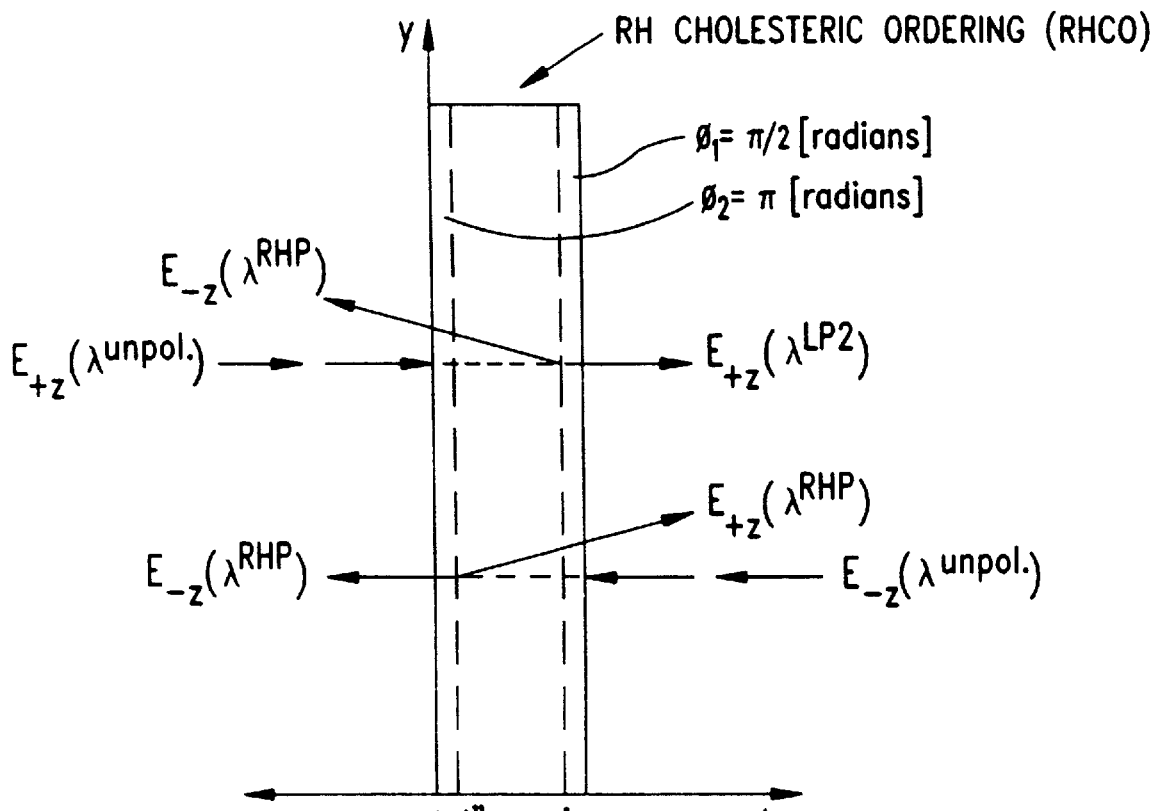
FIG.8B1
$$E_{+z}(\lambda^{unpol.}) \; \square \; P(\pi;RHCO;\pi/2) \Longrightarrow E_{-z}(\lambda^{RHP}), E_{+z}(\lambda^{LP2})$$
$$E_{-z}(\lambda^{unpol.}) \; \square \; P(\pi/2;RHCO;\pi) \Longrightarrow E_{+z}(\lambda^{RHP}), E_{-z}(\lambda^{RHP})$$
FIG.8B2

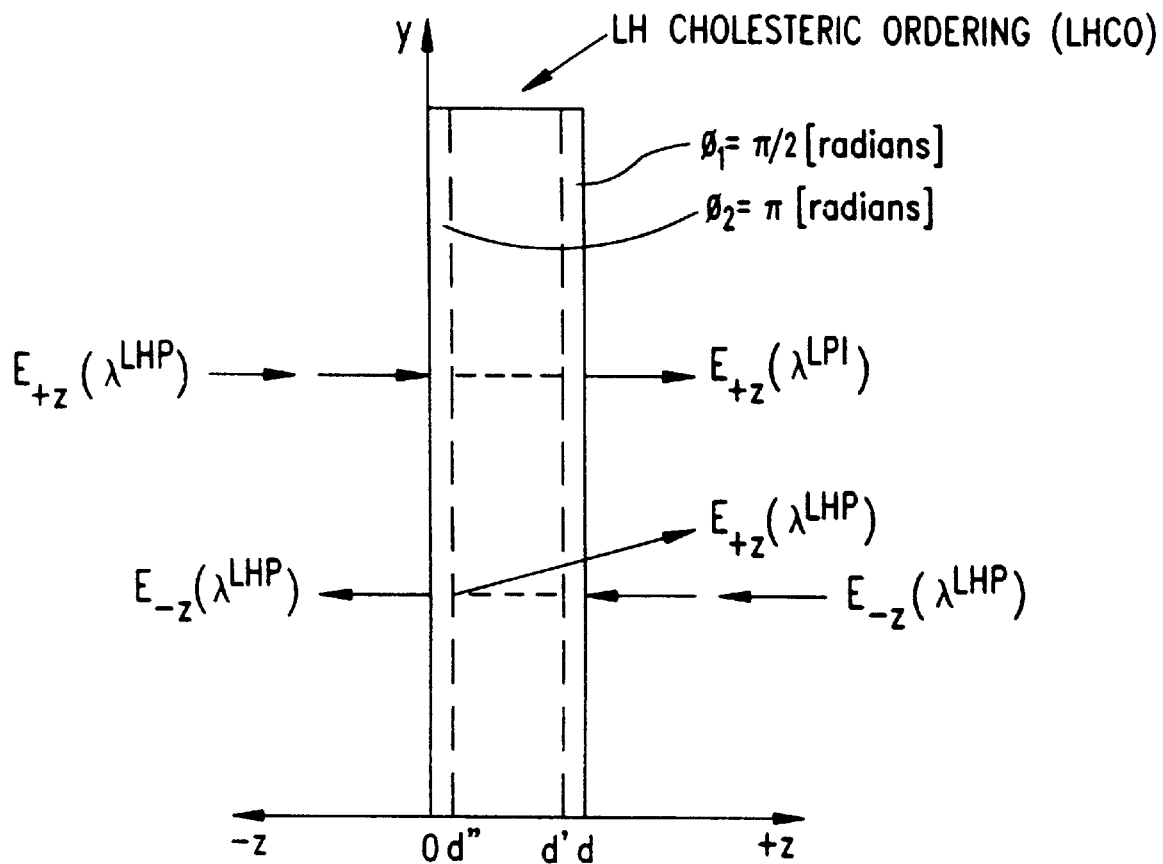
FIG.8C1
$$E_{+z}(\lambda^{LHP}) \;\square\; P(\pi;LHCO;\pi/2) \Longrightarrow E_{-z}(\lambda^{LPI})$$
$$E_{-z}(\lambda^{LHP}) \;\square\; P(\pi/2;LHCO;\pi) \Longrightarrow E_{+z}(\lambda^{LHP}), E_{-z}(\lambda^{LHP})$$
FIG.8C2

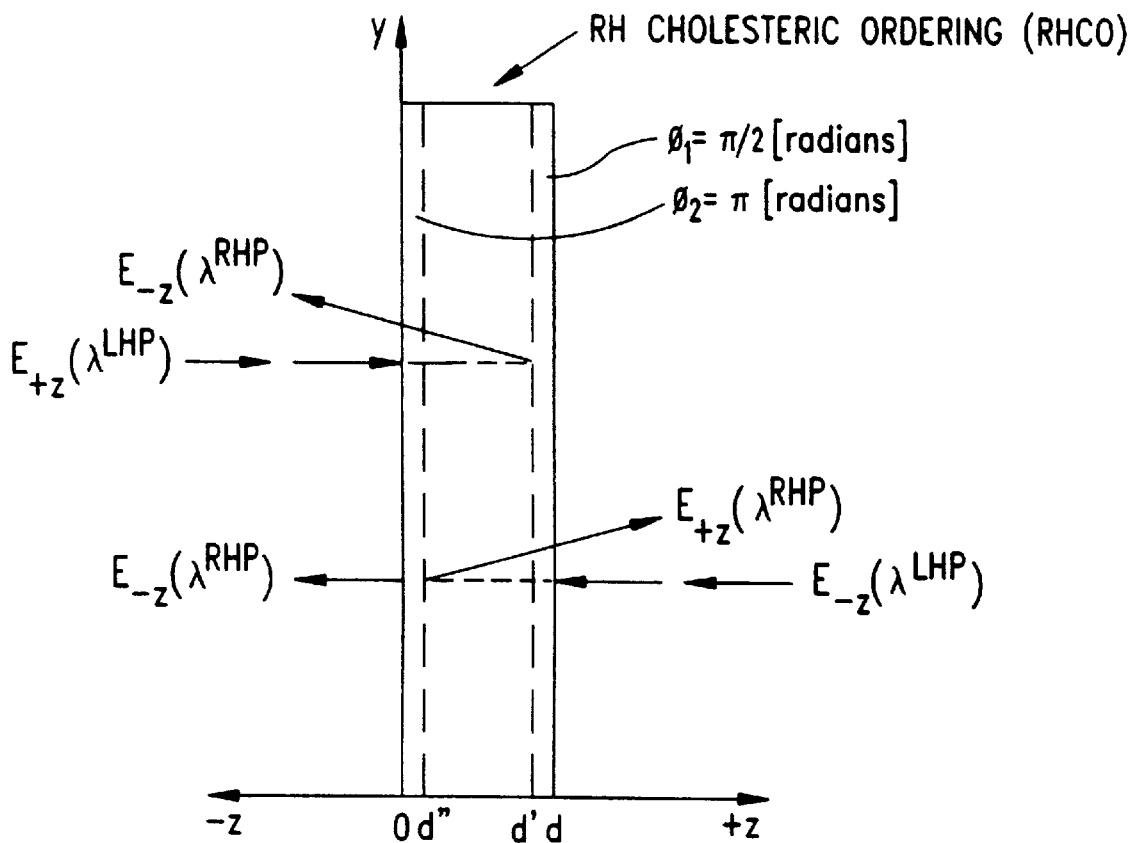
FIG.8D1
$$E_{+z}(\lambda^{LHP}) \; \square \; P(\pi; RHCO; \pi/2) \Longrightarrow E_{-z}(\lambda^{RHP})$$
$$E_{-z}(\lambda^{LHP}) \; \square \; P(\pi/2; RHCO; \pi) \Longrightarrow E_{-z}(\lambda^{RHP}), E_{-z}(\lambda^{RHP})$$
FIG.8D2

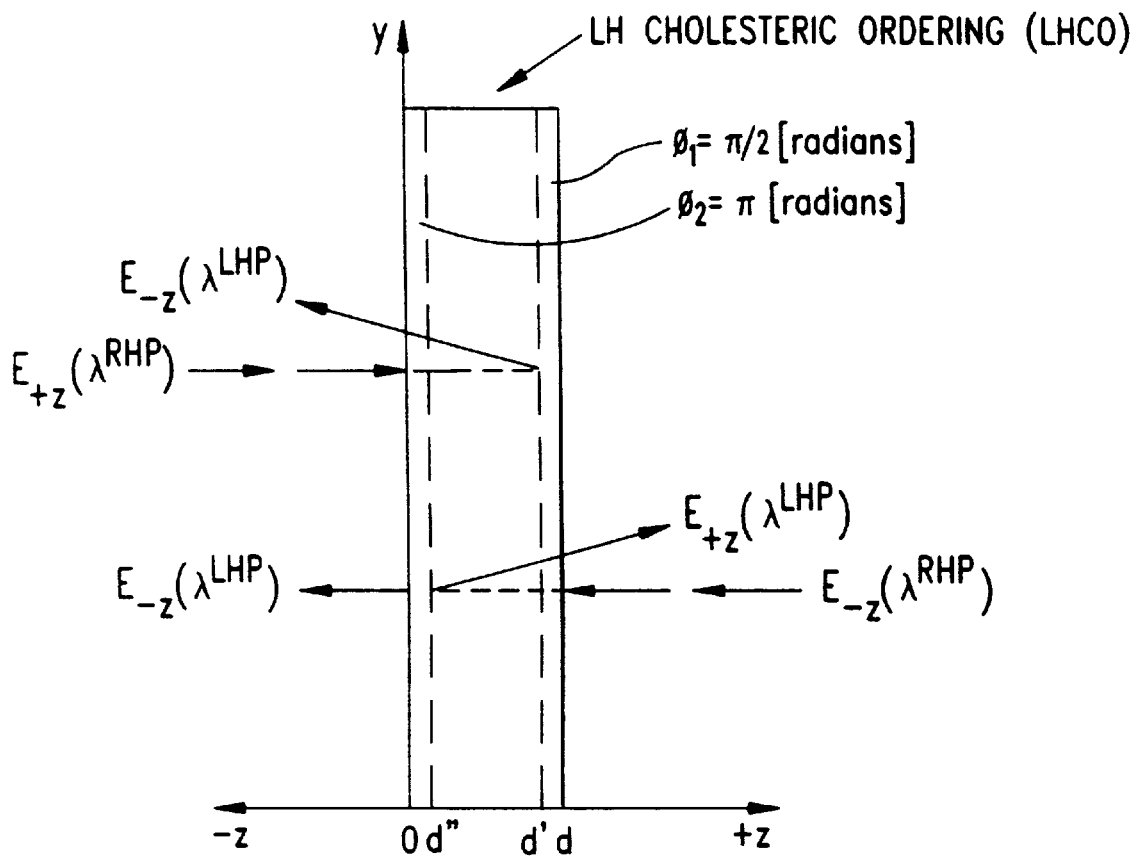
FIG.8E1
$$E_{+z}(\lambda^{RHP}) \; \Box \; P(\pi; LHCO; \pi/2) \Longrightarrow E_{-z}(\lambda^{LHP})$$
$$E_{-z}(\lambda^{RHP}) \; \Box \; P(\pi/2; LHCO; \pi) \Longrightarrow E_{+z}(\lambda^{LHP}), E_{-z}(\lambda^{LHP})$$
FIG.8E2

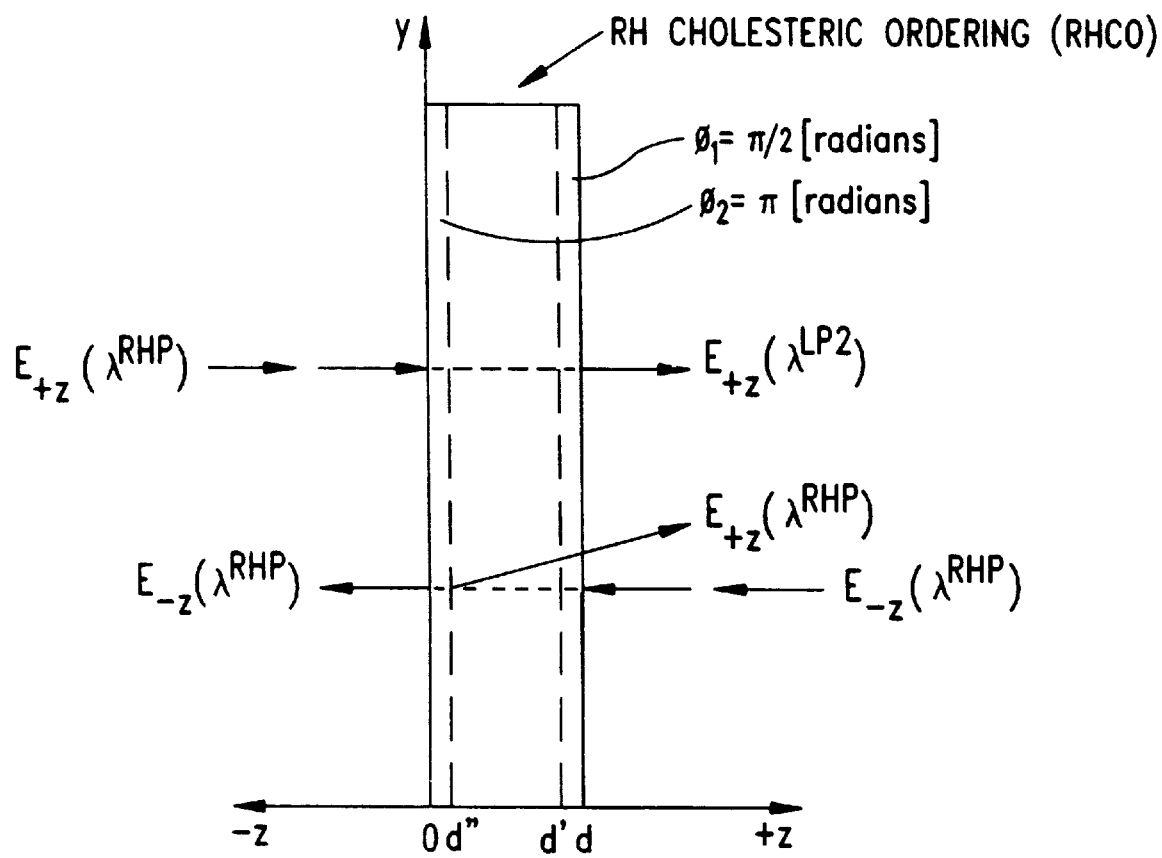
FIG.8F1
$$E_{+z}(\lambda^{RHP}) \;\square\; P(\pi; RHCO; \pi/2) \Rightarrow E_{+z}(\lambda^{LP2})$$
$$E_{-z}(\lambda^{RHP}) \;\square\; P(\pi/2; RHCO; \pi) \Rightarrow E_{+z}(\lambda^{RHP}), E_{-z}(\lambda^{RHP})$$
FIG.8F2

LIQUID CRYSTAL FILM STRUCTURES WITH PHASE-RETARDATION SURFACE REGIONS FORMED THEREIN AND METHODS OF FABRICATING THE SAME

RELATED CASES

This Application is a Continuation-in-Part of: application Ser. No. 08/739,467 entitled "Circularly Polarizing Reflective Material Having Super Broad-Band Reflection And Transmission Characteristics And Method Of Fabricating And Using Same In Diverse Applications" by Le Li, Yingqiu Jiang and Sadeg M. Faris filed on Oct. 29, 1996 U.S. Pat. No. 6,034,753; and application Ser. No. 08/550,022 entitled "Single Layer Reflective Super Broadband Circular Polarizer and Method of Fabrication Therefor" by Sadeg M. Faris and Le Li filed Oct. 30, 1995 U.S. Pat. No. 5,691,789; both of which are incorporated herein by reference as if set forth fully herein.

BACKGROUND OF THE INVENTION

1. Field of Invention

The present invention relates generally to liquid crystal (LC) phase-retarders realized by a liquid crystal film structure having one or more phase retardation regions formed therein, with each region having an optical axis and a phase retardation specified by the direction and depth of orientation of liquid crystal molecules along the surface of the liquid crystal film structure, and more particularly relates to linear cholesteric liquid crystal (CLC) polarizers realized by forming one or more phase retardation regions within CLC film structures.

2. Brief Description of the State of the Art

In the contemporary period, there is a great need to modulate the spatial intensity of light in liquid crystal display (LCD) panels, optical computing systems, holographic information storage and retrieval systems and the like. In nearly all such optical applications, linear polarizers are required to carry out this light intensity modulation function. In one form or another, a pair of linear polarizers are rotated relative to each other to produce a filter structure having a particular light transmittivity.

For example, in LCD panels, light produced by a backlighting structure (e.g. fluorescent tubes) is intensity modulated over pixel-sized regions by polarization-controlled pixel elements realized over the surface of the LCD panel. In particular, each pixel element is typically realized by interposing liquid crystal material between a pair of optically transparent electrodes which are connected to a computer-controlled voltage source response to digital image data sets corresponding to color or gray-scale images to be visually displayed. This liquid crystal structure is then disposed between a pair of linear polarizing filters. When a voltage level is impressed across the electrodes of each pixel element, an electric field is produced thereacross, causing the polarization direction of light transmitted from the first linear polarizing filter to rotate an amount proportional to the electric field strength and the light exiting from the second linear polarizing filter to be reduced in intensity. Accordingly, by simply controlling the electric field strength across the linear polarizing filter elements at each pixel element in an LCD panel, it is possible to control the intensity of light transmitted therefrom and thus form images at the surface of the LCD panel.

Presently, there exist two different types of polarizers, namely: dichroic (i.e. sheet) linear polarizers which operative upon an absorptive mechanism; and cholesteric liquid crystal (CLC) naturally-circular polarizers which operate upon a non-absorptive mechanism. It will be useful to briefly describe each of these linear polarizing structures below.

Dichroic linear polarizers were first invented by Edwin Land back in the early 1940's. This type of linear polarizing structure is based on a mechanism which absorbs and converts into heat the component of incident light along a first polarization direction P1, while transmitting without energy absorption the component of incident light along the desired orthogonal polarization direction, P2. Typically, such inefficient conversion of photonic energy results in the production of heat over the surface of the polarizer, causing undesired changes in the polarization characteristics of the polarizer, and at high intensities of incident light, the destruction of the polarizer. Also, by virtue of the inherent inefficiency of this type of polarizer, the use of dichroic polarizers in the construction of prior art LCD panels causes an inherent reduction in brightness by a factor of at least 50 percent. Yet, notwithstanding such shortcomings and drawbacks, the fact that dichroic linear polarizer can be produced in large surface areas and at low cost and weight, has lead to widespread use in LCDs and thus the proliferation of laptop computers.

In recent times, super broadband and narrow-band CLC-based linear polarizers have been developed for use in various optical applications. Exemplary structures can be found in copending U.S. application Ser. No. 08/550,022 of Applicant, supra, and EPO Application No. 94200026.6 entitled "Cholesteric Polarizer and Manufacture Thereof", both incorporated herein by reference as if set forth in their entirety.

One of the principal advantages of both narrow and broadband cholesteric polarizers alike is that such polarizers make it possible to very efficiently convert unpolarized light into circularly polarized light without the undesired absorption of photonic energy, characteristic of dichroic polarizers. The reason for this advantage is that narrow-band and broadband CLC films alike exhibit polarization and wavelength dependent reflection properties by virtue of the helical ordering of the CLC molecules in such films.

In particular, narrow-band CLC films having left handed helical ordering selectively reflect the left hand circularly polarized (LHCP) component of incident light having wavelengths within the narrow band (e.g. 10–50) nanometers), while transmitting through the polarizer the right hand circularly polarized (RHCP) component of incident light over that narrow-band. Narrow-band CLC films having right handed helical ordering selectively reflect the RHCP component of incident light having wavelengths within the narrow band while transmitting through the polarizer the LHCP component of incident light over that narrow-band.

Similarly, broadband CLC films having left handed helical ordering selectively reflect the LHCP component of incident light having wavelengths within the band of 400–800 nanometers, while transmitting through the polarizer the right hand circularly polarized (RCP) component of incident light over that narrow-band. Broadband CLC films having right handed helical ordering selectively reflect the RHCP component of incident light having wavelengths within the band of 400–800 nanometers, while transmitting through the polarizer the LHCP component of incident light over that narrow-band.

In their native form, the prior art CLC-based (i.e. cholesteric) polarizers are limited to optical applications where either left-handed or right-handed circularly polarized light is required, as described above. However, in many applications such as LCD panels, linear polarized light is required, as described above. Consequently, circularly polarized light produced from CLC circularly polarized film must be converted to linearly polarized light. In prior art CLC polarizers, polarization conversion is carried out by passing the circularly polarized light through a quarter wave phase retardation film. Preferably, this is achieved by laminating the quarter-wave retardation film onto the surface of the CLC-based circular polarizing film. While this composite structure can be produce linearly polarizing light without absorbing photonic energy and producing heat, characteristic of dichroic linear polarizers, such a composite linear polarizer suffers from a number of shortcomings and drawbacks.

In particular, when laminating the quarter-wave retardation film onto the CLC film, the designer is constrained to use only non-birefringent adhesives, to maximize transmissions of the desired polarization state and to avoid reduction in polarizer extinction ratio. To ensure optimal light transmission through the composite structure, it is necessary to match the refractive indices of the CLC film and the quarter-wave retardation film. Also, to avoid delamination of these films, it is necessary to thermally match the coefficients of thermal expansion thereof, which is not easily achieved. Collectively, these conditions and constraints render the manufacture of such non-absorbing linear polarizers very difficult, and greatly increase the cost of manufacture of such linear polarizing structures that utilize a quarter-wave retardation.

Thus, there is a great need in the art for a non-absorbing linear polarizer and a method of and apparatus for making the same, while avoiding the shortcomings and drawbacks associated with prior art CLC-based linear polarizing structures which require the lamination of quarter-wave retardation film material to a circularly polarizing CLC film structure.

OBJECTS AND SUMMARY OF INVENTION

Accordingly, a primary object of the present invention is to provide a liquid crystal film structure in which one or more birefringent phase-retardation regions are realized along the surface thereof, each having an optical axis specified by the direction of ordering of the liquid crystal molecules therein.

Another object of the present invention is to provide a liquid crystal linear polarizer, in which a birefringent phase-retardation region is realized along the surface of a cholesteric liquid crystal (CLC) film structure without laminating a quarter-wave phase retarder thereto, as required by prior art liquid crystal polarizing structures.

Another object of the present invention is to provide a liquid crystal film structure with one or more birefringent phase-retardation regions formed on the first and/or second surfaces thereof, wherein the direction of the optical axis of each surface-based phase-retardation region can be arbitrarily selected in order to any particular application at hand.

Another object of the present invention is to provide such a liquid crystal film structure, wherein the amount of phase retardation imparted to light passing through each birefringent phase-retardation region is determined by the surface depth of orientation of the liquid crystal molecules within the phase retardation region, and the optical axis of the phase retardation region is determined by the direction of molecular orientation effected therein.

Another object of the present invention is to provide a cholesteric liquid crystal (CLC) film structure with a birefringent phase-retardation region formed on one surface thereof, so that a cholesteric linear polarizer with a single characteristic polarization direction is realized in a single CLC film structure.

Another object of the present invention is to provide a cholesteric liquid crystal film structure with one or more birefringent phase-retardation regions formed on the first and/or second primary surfaces thereof, so that a cholesteric linear polarizer with a plurality of spatially-defined characteristic polarization directions is realized in a single CLC film structure.

Another object of the present invention is to provide a micropolarization panel realized on a single sheet of CLC film, in which the left pixel regions thereof have a first linear polarization state (i.e. linear polarization direction) coincident with a first birefringent phase retardation region realized by orienting the liquid crystal molecules at a first surface depth and along first reorientation direction to form a first plurality of linear polarizing elements, whereas the right pixel regions thereof have a second linear polarization state (i.e. linear polarization direction) coincident with a second birefringent phase retardation region realized by orienting the liquid crystal molecules at a second surface depth and long second reorientation direction to form a second plurality of linear polarizing elements orthogonal to the first plurality of linear polarizing elements.

Another object of the present invention is to provide a single CLC film structure with a birefringent phase-retardation region formed in the surface thereof, wherein the amount of phase retardation imparted to light passing therethrough is determined by the surface depth of orientation of the liquid crystal molecules in the CLC film structure, and the optical axis of the phase retardation region is determined by the direction of molecular orientation effected in the surface of the CLC film.

A further object of the present invention is to provide a method of and apparatus for producing such phase retardation regions in a sheet of CLC film, wherein reorientation of the cholesterically ordered molecules along the surface of the film is achieved by mechanically rubbing or burnishing the CLC film surface along the desired direction of molecular reorientation, and at a surface pressure sufficient to achieve the depth of molecular reorientation required to achieved the desired phase retardation over the burnished region.

A further object of the present invention is to provide a novel tool for performing molecular reorientation of the cholesterically ordered molecules along selected regions of the surface of CLC film material.

A further object of the present invention is to provide a method and apparatus for producing such birefringent phase retardation regions in a sheet of soft (i.e. unpolymerized) CLC film, wherein orientation of the nematically ordered molecules along the surface of the film is achieved during fabrication using UV light which aligns the liquid crystal molecules along the desired direction of molecular orientation, and at a molecular depth sufficient to achieve the desired phase retardation and optical axis direction over the treated region.

A further object of the present invention is to provide a novel system for reorientating liquid crystal molecules along selected regions of the surface of CLC film, using UV light.

Another object of the present invention is to provide a CLC-based linear polarizer for use in constructing the pixel elements of LCD panels having high-brightness characteristics.

Another object of the present invention is to provide a CLC film structure with one or more birefringent phase-retardation regions realized along the first and second principal surfaces thereof, by orienting the liquid crystal molecules along a particular orientation direction within the region, wherein each phase retardation region has an optical axis aligned along the direction of molecular orientation.

These and other objects of the present invention will become apparent hereinafter and in the Claims to Invention.

BRIEF DESCRIPTION OF THE DRAWINGS

For a more complete understanding of the Objects of the Present Invention the following Detailed Description of Illustrative Embodiments should be read in conjunction with the accompanying Drawings, wherein:

FIG. 3 is partial schematic diagram of a liquid crystal polarizer of the present invention, illustrating the reorientation of the cholesterically ordered molecules along the surface thereof, over an exemplary birefringent phase retardation region formed therein;

FIG. 4 is a schematic representation of a third narrow-band illustrative embodiment of the liquid crystal polarizer of the present invention realized in the form of a single film structure (i.e. sheet) having cholesterically ordered molecules, having a first birefringent phase retardation structure formed on the top surface thereof by orienting the cholesterically ordered molecules at a first depth thereof along a first molecular orientation direction;

FIG. 4A is a schematic cross-sectional representation of the liquid crystal linear polarizer shown in FIG. 4;

FIG. 4A1 is a graphical representation showing the chiral pitch characteristics of the liquid crystal polarizer of FIG. 4, plotted as a function of the surface depth of the cholesterically ordered molecules along the liquid crystal film structure, illustrating that the pitch approaches infinity at the surface thereof where the birefringent phase retardation structure is realized therein by way of molecular realignment;

FIG. 4A2 is a graphical representation of the phase retardation characteristics of the narrow-band birefringent phase retardation structure realized in the surface of the liquid crystal polarizer of FIG. 4, plotted as function of the wavelength of spectral components of incident light;

FIG. 4B is a schematic cross-sectional representation of a fourth, broadband embodiment of the liquid crystal polarizer of the present invention, realized in the form of a single film structure (i.e. sheet) having cholesterically ordered molecules with a non-linear pitch between its top and bottom surfaces thereof, and also showing a first phase retardation surface formed on the top surface thereof by orienting the cholesterically ordered molecules at a first depth thereof along a first molecular orientation direction;

FIG. 4B1 is a graphical representation of the chiral pitch characteristics of the cholesterically ordered molecules in a first form of the broadband liquid crystal polarizer of FIG. 4B, illustrating the large increase in cholesteric pitch along the surface of the liquid crystal polarizer where the cholesterically ordered molecules have been selectively reoriented to form the birefringent phase-retardation surface structure therein;

FIG. 4B2 is a graphical representation of the pitch characteristics of the cholesterically ordered molecules of a second, alternative form of the broadband liquid crystal polarizer of FIG. 4B, illustrating the large increase in cholesteric pitch along the surface of the liquid crystal polarizer where the cholesterically ordered molecules have been oriented to form the birefringent phase-retardation structure therein;

FIG. 4B3 is a graphical representation of the phase retardation characteristics of the broadband birefringent phase retardation structure realized in the surface of the liquid crystal polarizer of FIG. 4B, plotted as function of the wavelength of spectral components of incident light;

FIG. 5A1 is a schematic representation of a fifth illustrative embodiment of the liquid crystal polarizer of the present invention, wherein the amount of phase shift imparted by the birefringent phase retardation structure at the central wavelength $\lambda_C$ is π/2 radians, the cholesterically ordered molecules throughout the bulk of the polarizer have a left-handed cholesteric (LHC) ordering; and the incident light is produced from an unpolarized light source located on either side of the liquid crystal polarizer;

FIG. 5A2 is a set of mathematical expressions describing the behavior of the liquid crystal polarizer shown in FIG. 5A1 in response to incident light produced from an unpolarized light source located on either side of the liquid crystal polarizer;

FIG. 5B1 is a schematic representation of a sixth illustrative embodiment of the liquid crystal polarizer of the present invention, wherein the amount of phase shift imparted by the phase retardation structure at the central wavelength $\lambda_C$ is $\pi/2$ radians, the cholesterically ordered molecules throughout the bulk of the polarizer have a right-handed cholesteric (RHC) ordering, and the incident light is produced from an unpolarized light source located on either side of the liquid crystal polarizer;

FIG. 5B2 is a set of mathematical expressions describing the behavior of the liquid crystal polarizer shown in FIG. 5B1 in response to incident light produced from an unpolarized light source located on either side of the liquid crystal polarizer;

FIG. 5C1 is a schematic representation of a seventh illustrative embodiment of the liquid crystal polarizer of the present invention, wherein the amount of phase shift imparted by the phase retardation structure at the central wavelength $\lambda_C$ is $\pi/2$ radians, the cholesterically ordered molecules throughout the bulk of the polarizer have a LHC ordering, and the incident light is produced from a left-handed circularly polarized (LHCP) light source located on either side of the liquid crystal polarizer;

FIG. 5C2 is a set of mathematical expressions describing the behavior of the liquid crystal polarizer shown in FIG. 5C1 in response to incident light produced from a LHCP light source located on either side of the liquid crystal polarizer;

FIG. 5D1 is a schematic representation of a eighth illustrative embodiment of the liquid crystal polarizer of the present invention, wherein the amount of phase shift imparted by the phase retardation structure at the central wavelength $\lambda_C$ is $\pi/2$ radians, the cholesterically ordered molecules throughout the bulk of the polarizer have a RHC ordering, and the incident light is produced from a right-handed circularly polarized (RHCP) light source located on either side of the liquid crystal polarizer;

FIG. 5D2 is a set of mathematical expressions describing the behavior of the liquid crystal polarizer shown in FIG. 5D1 in response to incident light produced from a RHCP light source located on either side of the liquid crystal polarizer;

FIG. 5E1 is a schematic representation of a ninth illustrative embodiment of the liquid crystal polarizer of the present invention, wherein the amount of phase shift imparted by the phase retardation structure at the central wavelength $\lambda_C$ is $\pi/2$ radians, the cholesterically ordered molecules throughout the bulk of the polarizer have a LHC ordering, and the incident light is produced from a RHCP light source located on either side of the liquid crystal polarizer;

FIG. 5E2 is a set of mathematical expressions describing the behavior of the liquid crystal polarizer shown in FIG. 5E1 in response to incident light produced from a RHCP light source located on either side of the liquid crystal polarizer;

FIG. 5F1 is a schematic representation of a tenth illustrative embodiment of the liquid crystal polarizer of the present invention, wherein the amount of phase shift imparted by the phase retardation structure at the central wavelength $\lambda_C$ is $\pi/2$ radians, the cholesterically ordered molecules throughout the bulk of the polarizer have a RHC ordering, and the incident light is produced from RHCP light source located on either side of the liquid crystal polarizer;

FIG. 5F2 is a set of mathematical expressions describing the behavior of the liquid crystal polarizer shown in FIG. 5F1 in response to incident light produced from a RHCP light source located on either side of the liquid crystal polarizer;

FIG. 6 is a schematic representation of an eleventh illustrative embodiment of the liquid crystal linear polarizer of the present invention realized in the form of a single film structure (i.e. sheet) having (i) cholesterically ordered molecules between its top and bottom surfaces thereof, (ii) a first phase retardation structure formed on the top surface thereof by orienting the cholesterically ordered molecules at a first depth thereof along a first molecular orientation direction, and (iii) a second phase retardation structure formed on the bottom surface thereof by orienting the cholesterically ordered molecules at a second depth thereof along a second molecular orientation direction;

FIG. 6A is a schematic cross-sectional representation of a twelfth, narrow-band embodiment of the liquid crystal linear polarizer of the present invention, realized in the form of a single film structure (i.e. sheet) having cholesterically ordered molecules with a linear pitch between its top and bottom surfaces thereof, and also showing a first phase retardation structure formed on the top surface thereof by orienting the cholesterically ordered molecules at a first depth thereof along a first molecular orientation direction, and a second phase retardation structure formed on the bottom surface thereof by orienting the cholesterically ordered molecules at a second depth thereof along a second molecular orientation direction;

FIG. 6A1 is a graphical representation showing the pitch characteristics of the narrow-band liquid crystal polarizer of FIG. 6A, plotted as a function of the surface depth of the cholesterically ordered cholesterically ordered molecules along the liquid crystal film structure, illustrating that the pitch approaches infinity at both top and bottom surfaces thereof where the phase retardation structures are realized therein by way of molecular realignment;

FIG. 6B is a schematic cross-sectional representation of a thirteenth, broadband embodiment of the liquid crystal linear polarizer of the present invention, realized in the form of a single film structure (i.e. sheet) having cholesterically ordered molecules with a non-linear pitch between its top and bottom surfaces thereof, and also having a first phase retardation structure formed on the top surface thereof by orienting the cholesterically ordered molecules at a first depth thereof along a first molecular orientation direction, and a second phase retardation structure formed on the bottom surface thereof by orienting the cholesterically ordered molecules at a second depth thereof along a second molecular orientation direction;

FIG. 6B1 is a graphical representation of the pitch characteristics of the cholesterically ordered molecules in one form of the broadband liquid crystal polarizer of FIG. 6B, illustrating the large increase in cholesteric pitch along the top and bottom surfaces of the broad liquid crystal polarizer where the cholesterically ordered molecules have been molecularly reoriented to form the first and second birefringent phase-retardation structures therein;

FIG. 6B2 is a graphical representation of the pitch characteristics of the cholesterically ordered molecules in an alternative form of the broadband liquid crystal polarizer of FIG. 6B, illustrating the large increase in cholesteric pitch along the surface of the broadband liquid crystal polarizer where the cholesterically ordered (i.e. chiral phase) molecules have been reoriented to form the phase-retardation structures therein;

FIG. 7A1 is a schematic representation of a fourteenth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi/2$ radians, the cholesterically ordered molecules throughout the bulk of the polarizer have a LHC ordering, and the incident light is produced from an unpolarized light source located on either side of the liquid crystal polarizer;

FIG. 7A2 is a set of mathematical expressions describing the behavior of the liquid crystal polarizer shown in FIG. 7A1 in response to incident light produced from an unpolarized light source located on either side of the liquid crystal polarizer;

FIG. 7B1 is a schematic representation of a fifteenth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi/2$ radians, the cholesterically ordered molecules throughout the bulk of the polarizer have a RHC ordering, and the incident light is produced from an unpolarized light source located on either side of the liquid crystal polarizer;

FIG. 7B2 is a set of mathematical expressions describing the behavior of the liquid crystal polarizer shown in FIG. 7B1 in response to incident light produced from an unpolarized light source located on either side of the liquid crystal polarizer;

FIG. 7C1 is a schematic representation of a sixteenth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi/2$ radians the cholesterically ordered molecules throughout the bulk of the polarizer have a LHC ordering, and the incident light is produced from a LHCP light source located on either side of the liquid crystal polarizer;

FIG. 7C2 is a set of mathematical expressions describing the behavior of the liquid crystal polarizer shown in FIG. 7C1 in response to incident light produced from a LHCP light source located on either side of the liquid crystal polarizer;

FIG. 7D1 is a schematic representation of a seventeenth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi/2$ radians, the cholesterically ordered molecules throughout the bulk of the polarizer have a RHC ordering, and the incident light is produced from a RHCP light source located on either side of the liquid crystal polarizer;

FIG. 7D2 is a set of mathematical expressions describing the behavior of the liquid crystal polarizer shown in FIG. 7D1 in response to incident light produced from a RHCP light source located on either side of the liquid crystal polarizer;

FIG. 7E1 is a schematic representation of an eighteenth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi/2$ radians, the cholesterically ordered molecules throughout the bulk of the polarizer have a LHC ordering, and the incident light is produced from a RHCP light source located on either side of the liquid crystal polarizer;

FIG. 7E2 is a set of mathematical expressions describing the behavior of the liquid crystal polarizer shown in FIG. 7E1 in response to incident light produced from a RHCP light source located on either side of the liquid crystal polarizer;

FIG. 7F1 is a schematic representation of a nineteenth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi/2$ radians the cholesterically ordered molecules throughout the bulk of the polarizer have a RHC ordering, and the incident light is produced from RHCP light source located on either side of the liquid crystal polarizer;

FIG. 7F2 is a set of mathematical expressions describing the behavior of the liquid crystal polarizer shown in FIG. 7F1 in response to incident light produced from a RHCP light source located on either side of the liquid crystal polarizer;

FIG. 8A1 is a schematic representation of a twentieth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi$ radians, the cholesterically ordered molecules throughout the bulk of the polarizer have a LHC ordering, and the incident light is produced from an unpolarized light source located on either side of the liquid crystal polarizer;

FIG. 8A2 is a set of mathematical expressions describing the behavior of the liquid crystal polarizer shown in FIG. 8A1 in response to incident light produced from an unpolarized light source located on either side of the liquid crystal polarizer;

FIG. 8B1 is a schematic representation of a twenty-first illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi$ radians, the cholesterically ordered molecules throughout the bulk of the polarizer have a RHC ordering, and the incident light is produced from an unpolarized light source located on either side of the liquid crystal polarizer;

FIG. 8B2 is a set of mathematical expressions describing the behavior of the liquid crystal polarizer shown in FIG. 8B1 in response to incident light produced from an unpolarized light source located on either side of the liquid crystal polarizer;

FIG. 8C1 is a schematic representation of a twenty-second illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi$ radians the cholesterically ordered molecules throughout the bulk of the polarizer have a LHC ordering, and the incident light is produced from a LHCP light source located on either side of the liquid crystal polarizer;

FIG. 8C2 is a set of mathematical expressions describing the behavior of the liquid crystal polarizer shown in FIG. 8C1 in response to incident light produced from a LHCP light source located on either side of the liquid crystal polarizer;

FIG. 8D1 is a schematic representation of a twenty-third illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi$ radians, the cholesterically ordered molecules throughout the bulk of the polarizer have a RHC ordering, and the incident light is produced from a RHCP light source located on either side of the liquid crystal polarizer;

FIG. 8D2 is a set of mathematical expressions describing the behavior of the liquid crystal polarizer shown in FIG. 8D1 in response to incident light produced from a RHCP light source located on either side of the liquid crystal polarizer;

FIG. 8E1 is a schematic representation of a twenty-fourth illustrative embodiment of the liquid crystal polarizer of the present invention, wherein the amount of phase shift imparted by the first phase retardation structure at the central wavelength $\lambda_C$ is $\pi/2$ radians, the amount of phase shift imparted by the second phase retardation structure at the central wavelength $\lambda_C$ is $\pi$ radians, the cholesterically ordered molecules throughout the bulk of the polarizer have a LHC ordering, and the incident light is produced from a RHCP light source located on either side of the liquid crystal polarizer;

FIG. 8E2 is a set of mathematical expressions describing the behavior of the liquid crystal polarizer shown in FIG. 8E1 in response to incident light produced from a RHCP light source located on either side of the liquid crystal polarizer;

FIG. 8F1 is a schematic representation of a twenty-five illustrative embodiment of the liquid crystal polarizer of the present invention, wherein the amount of phase shift imparted by the first phase retardation structure at the central wavelength $\pi_C$ is $\pi/2$ radians, the amount of phase shift imparted by the second phase retardation structure at the central wavelength $\lambda_C$ is $\pi$ radians the cholesterically ordered molecules throughout the bulk of the polarizer have a RHC ordering, and the incident light is produced from RHCP light source located on either side of the liquid crystal polarizer; and FIG. 8F2 is a set of mathematical expressions describing the behavior of the liquid crystal polarizer shown in FIG. 8F1 in response to incident light produced from a RHCP light source located on either side of the liquid crystal polarizer.

DETAILED DESCRIPTION OF THE ILLUSTRATIVE EMBODIMENTS

Figure 1:
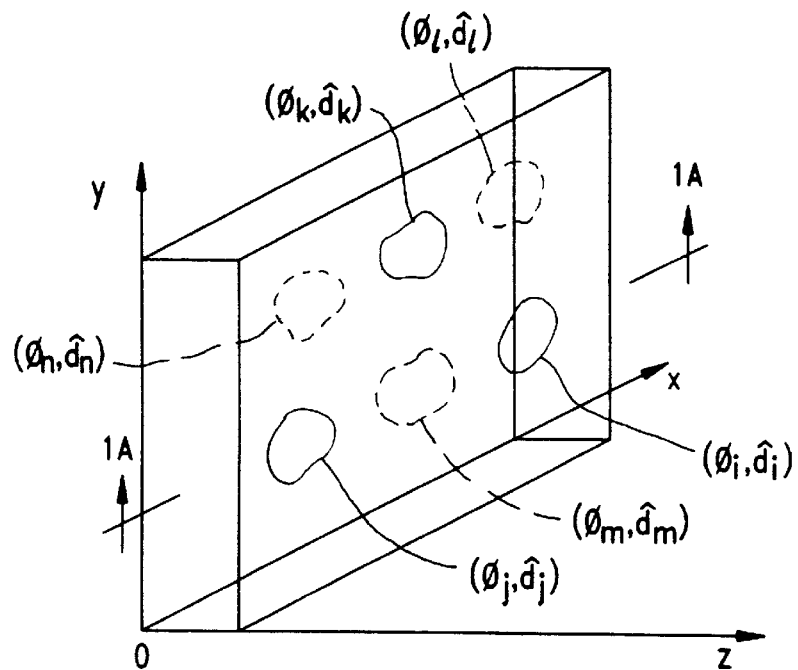
FIG. 1 is a schematic representation of a first embodiment of the liquid crystal polarizer of the present invention realized in the form of a single film structure (e.g. sheet) having (i) cholesterically ordered molecules between its top and bottom surfaces thereof, (ii) a first plurality of birefringent phase retardation regions formed at arbitrary locations on the top surface thereof, each imparting an amount of phase retardation to incident light (of wavelength λ) proportional to depth of reorientation of the cholesterically ordered molecules in the film structure and having an optical axis extending along the direction of reorientation within that region, and (iii) a second plurality of birefringent phase retardation regions formed at arbitrary locations on the bottom surface thereof, each imparting an amount of phase retardation to incident light (of wavelength λ) proportional to depth of reorientation of the cholesterically ordered molecules of the film structure and having an optical axis extending along the direction of reorientation within that region.

In general, the method of present invention can be used to produce one or more surface-based phase-retardation regions in single, non-laminated, solid-state liquid crystal film structures, in which each surface-based phase-retardation regions has an optical axis which may extend in an arbitrary direction. The solid-state liquid crystal film structures, in which the surface-based phase retardation regions are formed, may function as either liquid crystal phase retarders or as liquid crystal polarizers. The liquid crystal phase retarders can be designed to impart arbitrary amounts of phase retardation to incident light propagating therethrough, whereas the liquid crystal polarizers can be designed to impart either a particular linear or circular polarization state to incident light propagating therethrough.

In the case of liquid crystal retarders, the underlying solid-state liquid crystal film structure is comprised of liquid crystal molecules spatially ordered to provide a nematic phase, a twisted or super-twisted nematic phase, a smectic phase, or a ferro-electric phase suspended within a polymer phase that provides a substrate (or host) for the liquid crystal film structure. In accordance with the present invention, at least one surface-based birefringent phase retardation region is integrally formed in at least one surface region thereof, and has an optical axis which may extend in an arbitrary direction.

In the case of liquid crystal polarizers, the underlying solid-state liquid crystal film structure is comprised of liquid crystal molecules spatially ordered to provide a chiral (i.e. cholesteric) phase suspended within a polymer phase that provides a substrate (or host) for the liquid crystal film structure. In accordance with the present invention, at least one birefringent phase retardation region is integrally formed in at least one surface region thereof, and has an optical axis which may also extend in an arbitrary direction.

In accordance with the principles of the present invention, each surface-based birefringent phase retardation region is integrally formed in the surface of a liquid crystal film structure by orientating the liquid crystal molecules along a specified molecular reorientation direction therein. Under such conditions, the needle-like liquid crystals, suspended with the polymer phase of the film structure, are aligned along the specified orientation direction, and thus the density of the film structure is greater along the specified orientation direction. From the viewpoint of optical physics, such molecular orientation of the needle-like liquid crystals modulates the bulk or average refractive index of the film structure in such a manner that the density of the liquid crystal film structure is different along its x-axis coordinate direction than it is along its y-axis coordinate direction, and thus a condition of birefringence is established therein. As result of such birefringence, the phase velocity of an incident light wave propagating through these oriented liquid crystals is different along the x coordinate direction of the film structure than it is along the y coordinate direction. The amount of phase (i.e. optical) retardation achieved at any particular wavelength is determined by the particular surface depth to which molecular reorientation is achieved. The optical axis of the birefringent phase retardation region is determined by the particular direction along which the liquid crystal molecules are oriented. In general, there are several ways to realize such birefringent phase retardation structures in a spatially selective (i.e. localized) manner within the surface of a liquid crystal film structure. Such techniques will be described in great detail hereinafter.

By virtue of the present invention, there is no longer any need to laminate a $\pi/2$ phase retarder to a LHP or a RHP cholesteric liquid crystal (CLC) polarizer, as taught in EPO Patent Publication No. 94200026.6, in order to realize a linear cholesteric polarizer. Moreover, by providing a simple way of realizing localized birefringent phase retardation structures along the surface of CLC films without the use of laminating techniques characteristic of prior art fabrication processes, it is now possible to inexpensively fabricate diverse types of light polarizing cholesteric structures in the form of single solid-state CLC films.

It is understood that the present invention can be practiced using liquid crystal film structures having liquid crystal molecules which have been ordered so that they either impart a specified amount of phase retardation to incident light passing therethrough, or impart a circular polarization state thereto. However, for purposes of illustration, the particular illustrative embodiments shown in the figures hereof are directed to cholesteric liquid crystal (CLC) film structures and various types of phase-retardation surface structures that can be formed therein for diverse applications. By simply replacing such CLC film structures with nematic, quasi-nematic, twisted nematic, smectic or ferroelectric liquid crystal film structures, a diverse array of liquid crystal phase retardation structures can be readily designed and fabricated by those skilled in the art having had the benefit of reading the disclosure hereof.

An excellent tutorial and overview on the polarization-reflective properties of CLC materials and principles of polarization state conversion (i.e. linear-to-circular, circular-to-linear, linear-to-linear, circular-to-circular, unpolarized-to-linear, and unpolarized-to-circular) can be found in Applicant's U.S. Pat. No. 5,221,982, incorporated herein by reference in its entirety.

Figure 1A:
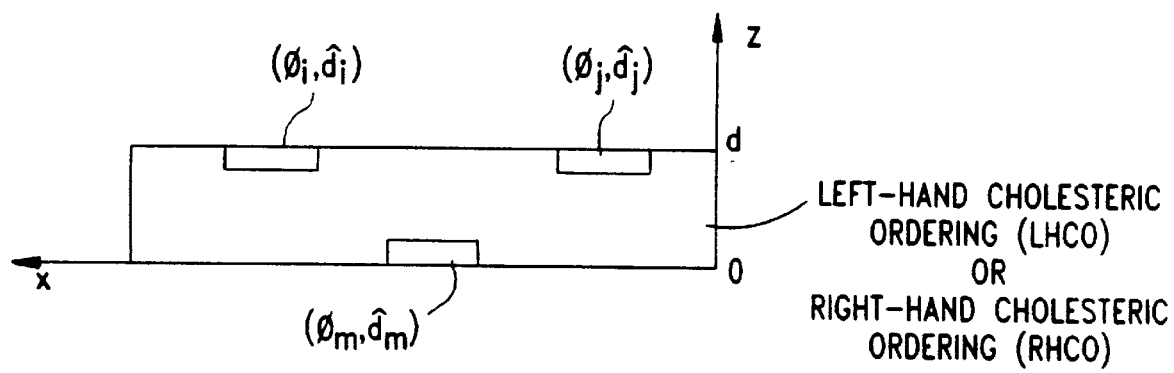
FIG. 1A is a schematic cross-sectional representation of the liquid crystal polarizer of FIG. 1.

As illustrated in FIG. 1, a first generalized embodiment of the liquid crystal structure of the present invention comprises a single layer of solid-state CLC film having a first plurality of birefringent phase retardation regions ($\phi_i$, $d_i$), ($\phi_j$, $d_j$), ($\phi_k$, $d_k$) formed in the top or upper surface thereof, and a second plurality of birefringent phase retardation regions ($\phi_l$, $d_l$), ($\phi_m$, $d_m$), ($\phi_n$, $d_n$) formed in the bottom or lower surface thereof. In general, the location and size of each such birefringent phase retardation region can be arbitrarily selected, as illustrated in FIGS. 1 and 1A. However, as illustrated in the second generalized embodiment of FIGS. 2 and 2A, it might be desired in particular applications to fix the size and location of one or more birefringent phase retardation regions on the top surface of the film structure so that they are spatially coincident (i.e. in spatial registration) with one or more birefringent phase retardation regions on the bottom surface of the film structure. Such structural features need be unique to only particular embodiments of the present invention, and thus should not be deemed to limit the scope of the present invention.

In general, the liquid crystal structure of the present invention can be made from either solid-state or liquid-state CLC films having either: (i) left-hand (LH) cholesterically ordered molecules (i.e. left-handed chiral phase) so that left-hand circularly polarized (LHCP) light within characteristic reflection band $\Delta\lambda_{reflection}^{LHCP}$ incident thereupon is reflected, while right-hand circularly polarized (RHCP) light within this band incident thereupon is transmitted therethrough; or (ii) right-hand (RH) cholesterically ordered molecules (i.e. right-handed chiral phase) so that right-hand circularly polarized (RHCP) light $\Delta\lambda_{rflection}^{RHCP}$ incident thereupon is reflected, while left-hand circularly polarized (LHCP) light within this band incident thereupon is transmitted therethrough. Notably, the polarization-dependent light reflection characteristics $\Delta\lambda_{rflection}^{LHCP}$ and $\Delta\lambda_{rflection}^{RHCP}$ can be designed to extend over a narrow-band of wavelengths along electromagnetic spectrum (e.g. 20–80 nanometers), or over a super broadband of wavelengths (e.g. 200–7000 nanometers).

In the case of narrow-band liquid crystal polarizers of the present invention, the CLC films can be realized by mixing polymer material with chiral additives to achieve a particular degree of LH chiral phase and/or RH chiral phase, whichever the application requires. Notably, when making such narrow-band CLC film, care must taken to ensure that the pitch of the cholesterically ordered liquid crystal molecules is substantially uniform (i.e. constant) along the depth of the film structure. A suitable method of making CLC film with narrow-band operating characterics, is disclosed in U.S. Pat. No. 5,221,982 to Faris, incorporated herein by reference. These methods are suitable for use in making narrow-band liquid crystal polarizers according to the present invention.

In the case of broadband liquid crystal polarizers, the CLC films can be realized by mixing polymer material with chiral additives to achieve a particular degree of LH chiral phase and/or RH chiral phase, whichever the application requires. However, when making such broadband CLC film, care must taken to ensure that the pitch of the cholesterically ordered molecules is substantially non-linear along the depth of the film structure, rather than constant pitch, as in the case of narrow-band CLC films. A suitable method for making CLC film having super broadband operating characterics is disclosed in copending U.S. application Ser. Nos. 08/550, 022 entitled "Single Layer Reflective Super Broadband Circular Polarizer and Method of Fabrication Therefor", by Sadeg M. Faris, et al., Oct. 30, 199r, now U.S. Pat. No. 5,691,789 and 08/739,467 entitled "Circularly Polarizing Reflective Material Having Super Broad-Band Reflection And Transmission Characteristics And Method Of Fabricating And Using Same In Diverse Applications" by Le Li, Yingqiu Jiang and Sadeg M. Faris filed on Oct. 29, 1996, now U.S. Pat. No. 6,034,753 each incorporated herein by reference. This method is suitable for use in making broadband liquid crystal polarizers according to the present invention. According to this method, CLC material and a second liquid crystal material are mixed with a photoinitiator, and then the combination is exposed to actinic radiation in order to produce liquid crystal polarizers having a bandwidth approaching 7000 nm.

As illustrated in FIG. 3, a portion of a liquid crystal structure of the present invention is schematically depicted. As shown the cholesterically ordered (i.e. chiral) crystal liquid molecules constituting the chiral phase of the CLC film occupy the bulk portion of the film structure, whereas along the top surface of the CLC film structure the liquid crystal molecules have been (re)ordered to constitute a nematic phase. In narrow band liquid crystal polarizing structures, the chiral ordering will exhibit constant (i.e. uniform) pitch characteristics, while the chiral ordering of super broadband liquid crystal polarizers will typically exhibit non-linear pitch characteristics. Notably, in the example of FIG. 3, the depth of such cholesteric ordering extends from 0 to d', along the z axis of the embedded coordinate reference system.

Along the top surface of the CLC film structure, the liquid crystal molecules have been oriented along a particular direction, and to a particular surface depth. The direction of molecular orientation is indicated by vector $d_i$, and determines the optical axis of the resulting birefringent optical-phase retardation structure formed therein. The surface depth along which such molecular orientation is achieved determines the optical retardation which the phase retardation structure imparts to visible electromagnetic radiation (i.e. light) of a particular wavelength propagating therethrough.

Insofar as it pertains to birefringence and the operation of the liquid crystal polarizers hereof, the term "optical retardation" and "phase retardation" as used hereinafter is best defined by way of the following explanation set forth below.

It is well known, that an electromagnetic wave incident on a birefringent structure or device is decomposable into two wave components, known as the ordinary and extraordinary wave components. These wave components are deemed to propagate along the ordinary and extraordinary axes of the birefringent structure at different velocities, and upon the exit of an incident light ray, one component will have its phase retarded with respect to the other, causing a rotation of its electric field intensity in the plane of polarization. For the liquid crystal polarizer of the present invention, the phase difference (i.e. retardation) introduced is proportional to the path length of light in the medium and is given by the equation:

$$\Delta = 2\pi(n_e - n_0)T/\lambda$$

where $\Delta$ is the phase difference, T is the thickness or depth of the localized phase retardation region within the liquid crystal medium, and $n_e$ and $n_o$ are the indices of refraction of the phase-retardation region along the extraordinary and ordinary axes thereof, respectively, wherein the optical axis of the phase retardation region is disposed 45 degrees to these axes.

As an example, a quarter-wave phase retardation region integrally formed in the liquid crystal film structure hereof produces (i.e. imparts) a phase retardation of $\Delta = \pi/2$, and will require a depth of surface molecular reorientation (at characteristic wavelength $\lambda$) equal to $T = \lambda/4(n_e - n_0)$, where $(n_e - n_0)$ is equivalent to the depth of index modulation due to molecular reorientation, and can be empirically determined in a straightforward manner by those skilled in the art.

In accordance with the principles of the present invention, a birefringent phase retardation region or surface area is realizable by simply orienting the liquid crystal molecules of the CLC film structure along a particular orientation direction, to a surface depth related to the amount of optical retardation required at the phase retardation region. In general, several different methods may be used to effect molecular reorientation along the surface of CLC film structure or portion thereof having either super broadband or narrow-band reflection/transmission characteristics.

The preferred method of forming a localized birefringent phase retardation region or surface area with a predetermined optical axis involves treating the surface of CLC film while in its "soft" (uncured) or liquid state. Specifically, the method involves applying a first layer of Indium Tin Oxide (ITO) on a first sheet of glass, and then depositing a layer of azo dye upon the ITO layer. Thereafter, a uniform layer of CLC film material in its liquid state is applied upon the azo dye layer. Methods for selecting and mixing the CLC components of the CLC mixture are described in: U.S. application Ser. No. 08/550,022, now U.S. Pat. No. 5,691, 879 supra; U.S. application Ser. No. 08/739,467 entitled "Circularly Polarizing Reflective Material Having Super Broad-Band Reflection And Transmission Characteristics And Method Of Fabricating And Using Same In Diverse Applications" by Le Li, Yingqiu Jiang and Sadeg M. Faris filed on Oct. 29, 1996; now U.S. Pat. No. 6,034,753 the SID publication entitled "Cholesteric Reflectors with a Color Pattern" by R. Maurer, F-H Kreuzer and J. Stohrer published at pages 399–402 of SID 94 DIGEST (1994); and the SID publication entitled "Polarizing Color Filters Made From Cholesteric LC Silicones" by Roobert Maurer, Dirk Andrejewski, Franz-Heinrich Kreuzer, and Alfred Miller, at pages 110–113 of SID 90 DIGEST (1990); each said document being incorporated herein by reference in its entirety. Preferably, polymerizable (e.g. cross-linkable) CLC component and photointiator are added to the CLC material for curing the CLC film material in response to exposure to actinic radiation (e.g. UV light).

Naturally, through "cis transformation", the liquid crystal molecules in the applied CLC film material automatically align upon the azo dye layer to form a layer of cholesterically ordered molecules (i.e. chiral phase). Then while the liquid crystal molecules are in a liquid state chiral phase, the surface region of the film along which, or in which a phase retardation structure is to be integrally formed, is exposed to polarized ultra-violet (UV) light. The effect of the polarized ultra-violet (UV) light is to cause the liquid crystal molecules to become aligned along the direction of the electric field intensity of the UV light. This causes phase retardation regions to be formed on the CLC film structure having optical axes extending in the direction of the electric field intensity of the UV light.

Notably, if the localized phase retardation regions are arranged according to a particular pattern on the CLC film structure (e.g. according to an arbitrary pattern or a pixelated array), then the polarized UV light will be spatially-filtered (i.e. masked) using a spatial-filter that spatially corresponds with the desired pattern so that the localized phase retardation regions are formed on the CLC film according to the spatial-filtering function. Importantly, the direction of the electric field intensity of the UV light pattern determines both (i) the direction along which the liquid crystal molecules align in response to the UV light exposure and (ii) the direction of the optical axis of the phase retardation regions formed by the alignment of the liquid crystal molecules. As such, the polarization direction of the UV light will be selected so that it is oriented in the same direction along which the optical axis of the resulting phase retardation region extends. The magnitude of the electric field intensity of such polarized UV light is selected so that the electric field intensity thereof penetrates a depth in the liquid-state film sufficient to achieve the desired amount of phase shift at the central operating wavelength of the liquid crystal polarizer being fabricated. When the liquid crystal molecules within the subject region are aligned (i) along the polarization direction of the applied UV light and (ii) at the desired surface depth, the CLC film structure in its liquid state is thereafter cured. While there are various ways in which to cure such a CLC film structure in this state, the preferred method would be to expose it to actinic radiation (e.g. ultra-violet radiation) of a particular intensity so that in the presence of a photoinitator, the photo-responsive polymerizable (e.g. cross-linkable) component added of the liquid CLC material is polymerized in the presence of a photoinitiator.

A second method of forming localized phase-retardation regions involves "reorienting" the cholesterically ordered liquid crystal molecules along the surface of CLC film having its chiral phase in a nonfully-cured ("soft") state. In this "soft" state, the CLC film includes a CLC polymerizable (e.g. cross-linkable) component and photoinitiator, but has not yet been exposed to actinic radiation to cause polymerization (i.e. curing). This technique can be carried out by physically rubbing the surface of the "soft" CLC film in the direction along which the optical axis of the resulting phase retardation structure is desired, and with a sufficient degree of downward pressure so as to effect molecular reorientation within a surface depth in the film so that the desired degree of phase shift is achieved at the central operating wavelength $\lambda_C$ of the liquid crystal polarizer. Notably, such rubbing operations can be achieved using a tool having a suitably textured surface. Such operations can be carried out manually, or using computer-controlled machinery well known in the robotics art. Advantageously, using this technique, minimal pressure is required to cause the desired molecular reorientation for phase retardationregion formation. After the above-described molecular reorientation operations have been carried out, the "soft" CLC film is then exposed to actinic radiation (e.g. UV light) to cause polymerization of the CLC film material and thus cure the same, thereby rendering permenant the phase retardation region or regions formed therein.

A third method of forming localized phase-retardation regions involves "reorienting" the cholesterically ordered liquid crystal molecules along the surface of CLC film having its chiral structure in a solid state. In this "solid" state, the CLC film has been previously polymerized (e.g. cured) by cross-linking the polymerizable CLC component of the CLC film material through exposure to actinic radiation. This technique can be carried out by physically rubbing the surface of CLC solid-state film in the direction along which the optical axis of the resulting phase retardation structure is desired, and with a sufficient degree of downward pressure so as to effect molecular reorientation within a surface depth in the film so that the desired degree of phase shift is achieved at the central operating wavelength $\lambda_C$ of the liquid crystal polarizer. Notably, such rubbing operations can be achieved using a tool having a suitably textured surface. Such operations can be carried out manually, or using computer-controlled machinery well known in the robotics art.

While three different methods have been described above for forming birefringent phase retardation regions within selected surface regions of CLC film material, it is understood that alternative techniques may be used or subsequently developed to effect such molecular reorientation within a single CLC film structure.

Figure 2:
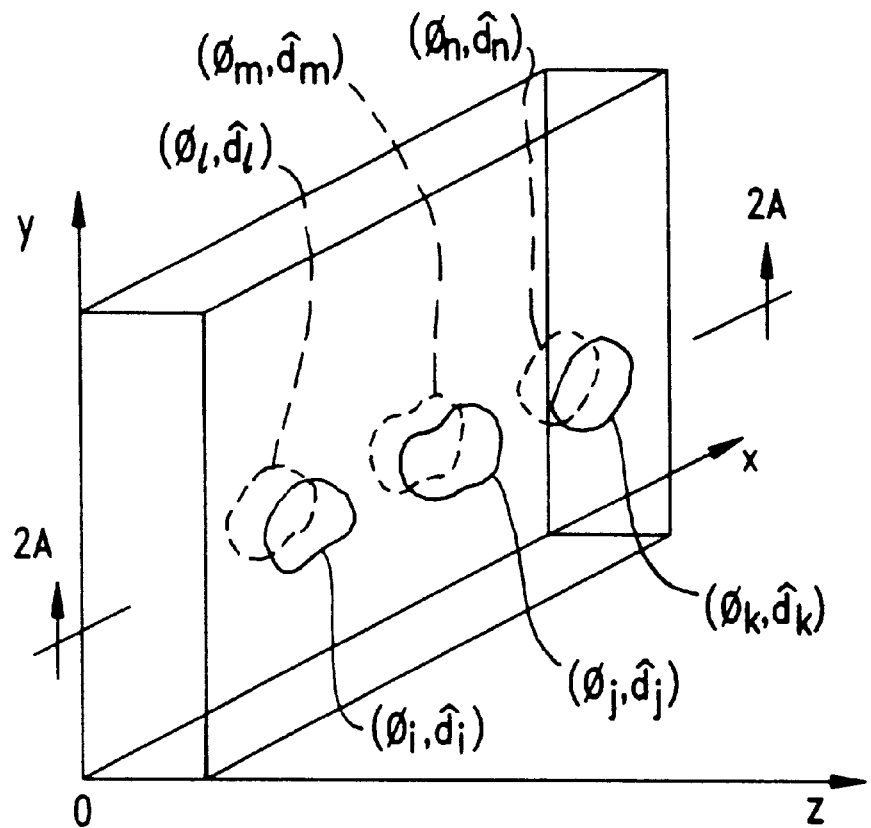
FIG. 2 is a schematic representation of a second illustrative embodiment of the liquid crystal polarizer of the present invention realized in the form of a single film structure having (i) cholesterically ordered molecules between its top and bottom surfaces thereof, (ii) a first plurality of birefringent phase retardation regions formed at a first set of prespecified locations on the top surface thereof, each imparting an amount of phase retardation to incident light (of wavelength λ) proportional to depth of reorientation of the cholesterically ordered molecules of the film structure and having an axis extending along the direction of reorientation within that region, and (iii) a second plurality of birefringent phase retardation regions formed at a second set of prespecified locations on the bottom surface thereof, spatially coincident (i.e. registered) with the first plurality of phase retardation regions, each imparting an amount of phase retardation to incident light (of wavelength λ) proportional to the depth of reorientation of the cholesterically ordered molecules of the film structure and having an axis extending along the direction of molecular reorientation within that region.

Referring to FIGS. 1 through 2B, several generalzed embodiments of the liquid crystal optical structure of the present invention will be described below.

In FIGS. 1 and 1A, a first generalized embodiment of the liquid crystal optical structure of the present invention is schematically illustrated in the form of liquid crystal polarizer. As shown in these figures, the liquid crystal polarizer is realized in the form of a single film layer (e.g. a thin film sheet) having (i) a first plurality of birefringent phase retardation regions formed at arbitrary locations on the top surface thereof, (ii) a second plurality of birefringent phase retardation regions formed at arbitrary locations on the top surface thereof, and (iii) LH or RH cholesterically ordered molecules disposed therebetween. Each of the birefringent phase retardation regions formed on the top surface of the film structure imparts an amount of phase retardation to incident light (of wavelength $\lambda$) proportional to depth of reorientation of the cholesterically ordered molecules in the film structure and has an optical axis extending along the direction of reorientation within that region. Each of the birefringent phase retardation regions formed on the bottom surface of the film structure also imparts an amount of phase retardation to incident light (of wavelength $\lambda$) proportional to depth of reorientation of the cholesterically ordered molecules of the film structure and has an optical axis extending along the direction of reorientation within that region. Thus, when figuring out how any particular phase retardation region on the top surface of the film structure effects the polarization state of incident light transmitted therethrough, it is important to ensure that optical axis of the phase retardation structure is properly oriented with respect to the optical axes of the other phase retardation regions formed therein. Typically, the optical axis is oriented at forty-five degrees with respect to the x and y axes of the liquid crystal polarizing sheet.

Figure 2A:
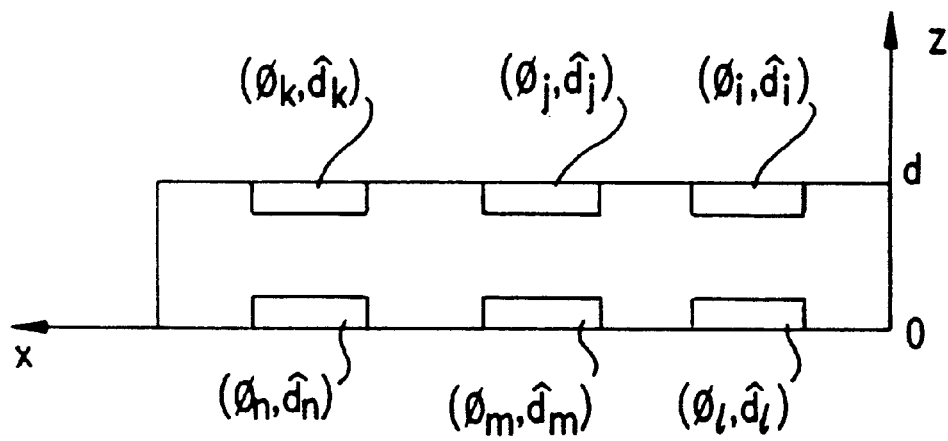
FIG. 2A is a schematic cross-sectional representation of the liquid crystal polarizer of FIG. 2.

In FIGS. 2 and 2A, a second embodiment of the liquid crystal structure of the present invention is schematically illustrated in the form of liquid crystal polarizer. As shown in these figures, the liquid crystal polarizer is realized in the form of a single film structure having (i) a first plurality of birefringent phase retardation regions formed at arbitrary locations on the top surface thereof, (ii) a second plurality of birefringent phase retardation regions formed at spatially-corresponding locations on the top surface thereof in registration with the phase retardation regions on the top surface thereof, and (iii) LH or RH cholesterically ordered molecules disposed therebetween. Each of the birefringent phase retardation regions formed on the top surface of the film structure impart an amount of phase retardation to incident light (of wavelength $\lambda$) proportional to depth of reorientation of the cholesterically ordered molecules in the film structure and have an optical axis extending along the direction of reorientation within that region. Each of the birefringent phase retardation regions formed on the bottom surface of the film structure an amount of phase retardation to incident light (of wavelength $\lambda$) proportional to depth of reorientation of the cholesterically ordered molecules of the film structure and has an optical axis extending along the direction of reorientation within that region. Thus, when figuring out how any particular phase retardation region on the top surface of the film structure effects the polarization state of incident light transmitted therethrough, it is important to ensure that the optical axis of the phase retardation structure is properly aligned with the optical axis of the spatially registered phase retardation region on the bottom surface thereof.

Based on the embodiments of the liquid crystal polarizer described above, an infinite variety of illustrative embodiments thereof can be designed and constructed in a manner which will become readily apparent skilled in the art having had the benefit the reading the present disclosure hereof.

In FIG. 4, a third illustrative embodiment of a liquid crystal polarizer of the present invention is shown in the form of a single film structure (i.e. sheet) having cholesterically ordered molecules throughout the bulk structure thereof. In this illustrative embodiment, a first birefringent phase retardation structure is formed on the top surface thereof by orienting the CLC molecules at a first depth thereof along a first molecular orientation direction. In FIG. 4A, a narrow-band embodiment of the liquid crystal linear polarizer of FIG. 4 is shown in the form of a single film structure (i.e. sheet) having cholesterically ordered molecules with a constant pitch between its top and bottom surfaces thereof. As shown, a first birefringent phase retardation structure is formed on the top surface thereof by reorienting the cholesterically ordered molecules at a first depth thereof along a first molecular reorientation direction. In FIG. 4A1, the pitch characteristics of the liquid crystal polarizer of FIG. 4A are graphically plotted as a function of the surface depth of the cholesterically ordered molecules along the liquid crystal film structure. Notably, this plot clearly illustrates that the pitch of the chiral phase approaches infinity at the surface thereof where the birefringent phase retardation structure is realized therein by way of molecular realignment. In FIG. 4A2, the phase retardation characteristics of the narrow-band birefringent phase retardation structure of FIG. 4A are plotted as function of the wavelength of spectral components of incident light. Notably, the actual phase retardation characteristics deviate from the ideal phase retardation characteristics, and only the band of wavelengths about the central operating wavelength are imparted with the desired phase shifts (e.g. $\pi/2$).

Consequently, while all of the electric field intensity at this central operating wavelength is shifted by $\pi/2$ radians, and thus is converted to the linear polarization state, only a portion of the electric field intensity of the other wavelengths within the narrow-band are converted to the linear polarization, with the balance thereof remaining elliptically polarized where the major axis is substantially greater than its minor axis (i.e. quasi-linearly polarized).

In FIG. 4B, a fourth broadband embodiment of the liquid crystal polarizer shown in FIG. 4 is shown realized in the form of a single film structure (i.e. sheet) having cholesterically ordered molecules throughout the bulk structure thereof. As shown, the cholesterically ordered molecules have a non-linear pitch between the top and bottom surfaces thereof. Also, a first phase retardation surface is formed on the top surface thereof by orienting the cholesterically ordered molecules at a first depth thereof along a first molecular orientation direction. FIG. 4B1 shows a graphical representation of the pitch characteristics of the cholesterically ordered molecules of a first embodiment of the super broadband liquid crystal polarizer of FIG. 4B. As illustrated in this figure, there is the large increase in cholesteric pitch along the surface of the liquid crystal polarizer where the cholesterically ordered molecules have been selectively reoriented to form the birefringent phase-retardation surface structure therein. In FIG. 4B2, the pitch characteristics of the cholesterically ordered molecules of a second, alternative embodiment of the broadband liquid crystal polarizer of FIG. 4B are shown. As illustrated in this figure, there is a large increase in cholesteric pitch along the surface of the liquid crystal polarizer where the cholesterically ordered molecules have been reoriented to form the birefringent phase-retardation structure therein. FIG. 4B3 graphically illustrates the phase retardation characteristics of the broadband birefringent phase retardation structure of FIG. 4B, plotted as function of the wavelength of spectral components of incident light.

In FIG. 5A1, a fifth illustrative embodiment of the liquid crystal polarizer of the present invention is shown. In this particular embodiment, the amount of phase shift imparted by the birefringent phase retardation structure is $\pi/2$ radians at the central wavelength $\lambda_C$, the cholesterically ordered molecules throughout the bulk of the polarizer have a LHC ordering, and the incident light is produced from an unpolarized light source located on either side of the liquid crystal polarizer. The set of mathematical expressions in FIG. 5A2 describe the behavior of the liquid crystal polarizer of FIG. 5A1 in response to incident light produced from an unpolarized light source located on either side of the liquid crystal polarizer. Notably, either linearly circularized light and/or LHCP light can be produced by directing a source of unpolarized light towards this embodiment of the liquid crystal polarizer of the present invention.

In FIG. 5B1, a sixth illustrative embodiment of the liquid crystal polarizer of the present invention is shown. In this particular embodiment of the present invention, the amount of phase shift imparted by the phase retardation structure is $\pi/2$ radians at the central wavelength $\lambda_C$, the cholesterically ordered molecules throughout the bulk of the polarizer have a RHC ordering, and the incident light is produced from an unpolarized light source located on either side of the liquid crystal polarizer. The set of mathematical expressions in FIG. 5B2 describe the behavior of the liquid crystal polarizer of FIG. 5B1 in response to incident light produced from an unpolarized light source located on either side of the liquid crystal polarizer. Notably, either linearly polarized light and/or RHCP light can be produced by directing a source of unpolarized light towards this embodiment of the liquid crystal polarizer.

In FIG. 5C1, a seventh illustrative embodiment of the liquid crystal polarizer of the present invention is shown. In this particular embodiment, the amount of phase shift imparted by the phase retardation structure is $\pi/2$ radians at the central wavelength $\lambda_C$, the cholesterically ordered molecules throughout the bulk of the polarizer have a LHC ordering, and the incident light is produced from a LHCP light source located on either side of the liquid crystal polarizer. The set of mathematical expressions in FIG. 5C2 describe the behavior of the liquid crystal polarizer of FIG. 5C1 in response to incident light produced from a LHCP light source located on either side of the liquid crystal polarizer. As described, either LHCP or RHCP light can be produced by directing a source of LHCP light towards this embodiment of the liquid crystal polarizer.

In FIG. 5D1, an eighth illustrative embodiment of the liquid crystal polarizer of the present invention shown. In this particular embodiment, the amount of phase shift imparted by the phase retardation structure at is $\pi/2$ radians the central wavelength $\lambda_C$, the cholesterically ordered molecules throughout the bulk of the polarizer have a RHC ordering, and the incident light is produced from a RHCP light source located on either side of the liquid crystal polarizer. The set of mathematical expressions in FIG. 5D2 describe the behavior of the liquid crystal polarizer of FIG. 5D1 in response to incident light produced from a RHCP light source located on either side of the liquid crystal polarizer. As described by such expressions, either linearly polarized light and/or RHCP and LHCP light can be produced by directing a LHCP light source towards this embodiment of the liquid crystal polarizer.

In FIG. 5E1, a ninth illustrative embodiment of the liquid crystal polarizer of the present invention shown. In this particular embodiment, the amount of phase shift imparted by the phase retardation structure is $\pi/2$ radians at the central wavelength $\lambda_C$, the cholesterically ordered molecules throughout the bulk of the polarizer have a LHC ordering, and the incident light is produced from a RHCP light source located on either side of the liquid crystal polarizer. The set of mathematical expressions in FIG. 5E2 describe the behavior of the liquid crystal polarizer of FIG. 5E1 in response to incident light produced from a RHCP light source located on either side of the liquid crystal polarizer. Either linearly polarized light or LHCP and RHCP light can be produced by directing a source of RHCP light towards the liquid crystal polarizer.

In FIG. 5F1, a tenth illustrative embodiment of the liquid crystal polarizer is shown. In this particular embodiment, the amount of phase shift imparted by the phase retardation structure is $\pi/2$ radians at the central wavelength $\lambda_C$ the cholesterically ordered molecules throughout the bulk of the polarizer have a RHC ordering, and the incident light is produced from RHCP light source located on either side of the liquid crystal polarizer. The set of mathematical expressions in FIG. 5F2 describe the behavior of the liquid crystal polarizer of FIG. 5F1 in response to incident light produced from a RHCP light source located on either side of the liquid crystal polarizer. As described by these expressions, either RHCP light or RHCP and LHCP light can be produced by directing a source of RHCP light towards this liquid crystal polarizer.

As shown in FIG. 6, the eleventh illustrative embodiment of the liquid crystal polarizer of the present invention is realized in the form of a single film structure (i.e. sheet) having a first phase retardation structure formed on the top surface thereof by orienting the cholesterically ordered molecules at a first depth thereof along a first molecular orientation direction, a second phase retardation structure formed on the bottom surface thereof by orienting the cholesterically ordered molecules at a second depth thereof along a second molecular reorientation direction, and cholesterically ordered molecules disposed therebetween. In FIG. 6A, a cross-sectional characteristics of a twelfth, narrow-band embodiment of the liquid crystal polarizer of FIG. 6 is shown in the form of a single film structure (i.e. sheet). As shown, this film structure has a first phase retardation structure formed on the top surface thereof by orienting the cholesterically ordered molecules at a first depth thereof along a first molecular orientation direction, and a second phase retardation structure formed on the bottom surface thereof by orienting the cholesterically ordered molecules at a second depth thereof along a second molecular orientation direction. The cholesterically ordered molecules disposed between these phase retardation structures have a constant pitch. In FIG. 6A1, the pitch characteristics of the narrow-band liquid crystal polarizer of FIG. 6A are plotted as a function of the surface depth of the cholesterically ordered cholesterically ordered molecules along the liquid crystal film structure. This graphical plot illustrates that the pitch approaches infinity at both top and bottom surfaces thereof where the phase retardation structures are realized therein by way of molecular realignment.

In FIG. 6B, a thirteenth, super broadband embodiment of the liquid crystal linear polarizer of FIG. 6 is shown realized in the form of a single film structure (i.e. sheet). The single film structure has a first phase retardation structure formed on the top surface thereof by orienting the cholesterically ordered molecules at a first depth thereof along a first molecular reorientation direction, and a second phase retardation structure formed on the bottom surface thereof by orienting the cholesterically ordered molecules at a second depth thereof along a second molecular orientation direction. The cholesterically ordered molecules between its top and bottom phase retardation structures have a non-linear pitch, which provides its broadband operating characteristics. FIG. 6B1 illustrates the pitch characteristics of the cholesterically ordered molecules in one embodiment of the broadband liquid crystal polarizer of FIG. 6B. Notably, FIG. 6B1 illustrates the large increase in cholesteric pitch along the top and bottom surfaces of the broad liquid crystal polarizer where the cholesterically ordered molecules have been molecularly reoriented to form the first and second birefringent phase-retardation structures therein. FIG. 6B2 illustrates the pitch characteristics of the cholesterically ordered molecules in an alternative embodiment of the broadband liquid crystal polarizer of FIG. 6B. FIG. 6B2 illustrates the large increase in cholesteric pitch along the surface of the super broadband liquid crystal polarizer where the cholesterically ordered (i.e. chiral phase) molecules have been reoriented to form the phase-retardation structures therein.

In FIG. 7A1, a fourteenth illustrative embodiment of the liquid crystal polarizer of the present invention is shown. In this particular embodiment, the amount of phase shift imparted by the first phase retardation structure is $\pi/2$ radians at the central wavelength $\lambda_C$, the amount of phase shift imparted by the second phase retardation structure is $\pi/2$ radians at the central wavelength $\lambda_C$, the cholesterically ordered molecules throughout the bulk of the polarizer have a LHC ordering, and the incident light is produced from an unpolarized light source located on either side of the liquid crystal polarizer. The set of mathematical expressions in FIG. 7A2 describe the behavior of the liquid crystal polarizer of FIG. 7A1 in response to incident light produced from an unpolarized light source located on either side of the liquid crystal polarizer. Either LHCP and linearly polarized light or RHCP and linearly polarized light can be produced by directing an unpolarized light source towards the liquid crystal polarizer of this particular embodiment.

In FIG. 7B1, a fifthteenth illustrative embodiment of the liquid crystal polarizer is shown. In this particular embodiment, the amount of phase shift imparted by the first phase retardation structure is $\pi/2$ radians, at the central wavelength $\lambda_C$ the amount of phase shift imparted by the second phase retardation structure is $\pi/2$ radians at the central wavelength $\lambda_C$, the cholesterically ordered molecules throughout the bulk of the polarizer have a RHC ordering, and the incident light is produced from an unpolarized light source located on either side of the liquid crystal polarizer. The set of mathematical expressions in FIG. 7B2 describe the behavior of the liquid crystal polarizer of FIG. 7B1 in response to incident light produced from an unpolarized light source located on either side of the liquid crystal polarizer. Using this liquid crystal polarizer, RHCP and linear polarized light can be produced by directing an unpolarized light source towards such a polarization structure.

In FIG. 7C1, a sixteenth illustrative embodiment of the liquid crystal polarizer hereof is shown. In this particular embodiment, the amount of phase shift imparted by the first phase retardation structure is $\pi/2$ radians at the central wavelength $\lambda_C$, the amount of phase shift imparted by the second phase retardation structure is $\pi/2$ radians at the central wavelength $\lambda_C$, the cholesterically ordered molecules throughout the bulk of the polarizer have a LHC ordering, and the incident light is produced from a LHCP light source located on either side of the liquid crystal polarizer. The set of mathematical expressions FIG. 7C2 describes the behavior of the liquid crystal polarizer of FIG. 7C1 in response to incident light produced from a LHCP light source located on either side of the liquid crystal polarizer. LHCP and linearly polarized light can be produced by directing a source of LHCP light towards this embodiment of the liquid crystal polarizer.

In FIG. 7D1, a seventeenth illustrative embodiment of the liquid crystal polarizer hereof is shown. In this illustrative embodiment, the amount of phase shift imparted by the first phase retardation structure is $\pi/2$ radians at the central wavelength $\lambda_C$, the amount of phase shift imparted by the second phase retardation structure is $\pi/2$ radians at the central wavelength $\lambda_C$, the cholesterically ordered molecules throughout the bulk of the polarizer have a RHC ordering, and the incident light is produced from a RHCP light source located on either side of the liquid crystal polarizer. The set of mathematical expressions in FIG. 7D2 describe the behavior of the liquid crystal polarizer of FIG. 7D1 in response to incident light produced from a RHCP light source located on either side of the liquid crystal polarizer. RHCP and linearly polarized light can be produced from this liquid crystal polarizer by directing a source of LHCP light towards this polarizer.

In FIG. 7E1, an eighteenth illustrative embodiment of the liquid crystal polarizer hereof is shown. In this particular embodiment, the amount of phase shift imparted by the first phase retardation structure is $\pi/2$ radians at the central wavelength $\lambda_C$, the amount of phase shift imparted by the second phase retardation structure is $\pi/2$ radians at the central wavelength $\lambda_C$, the cholesterically ordered molecules throughout the bulk of the polarizer have a LHC ordering, and the incident light is produced from a RHCP light source located on either side of the liquid crystal polarizer. The set of mathematical expressions in FIG. 7E2 describe the behavior of the liquid crystal polarizer of FIG. 7E1 in response to incident light produced from a RHCP light source located on either side of the liquid crystal polarizer. LHCP and linearly polarized light can be produced by directing LHCP light towards the liquid crystal polarizer.

In FIG. 7F1, a nineteenth illustrative embodiment of the liquid crystal polarizer hereof is shown. In this particular embodiment, the amount of phase shift imparted by the first phase retardation structure is $\pi/2$ radians at the central wavelength $\lambda_C$, the amount of phase shift imparted by the second phase retardation structure is $\pi/2$ radians at the central wavelength $\lambda_C$ the cholesterically ordered molecules throughout the bulk of the polarizer have a RHC ordering, and the incident light is produced from RHCP light source located on either side of the liquid crystal polarizer. The set of mathematical expressions in FIG. 7F2 describe the behavior of the liquid crystal polarizer of FIG. 7F1 in response to incident light produced from a RHCP light source located on either side of the liquid crystal polarizer. RHCP and linearly polarized light can be produced by directing a RHCP light source towards the liquid crystal polarizer.

In FIG. 8A1, a twentieth illustrative embodiment of the liquid crystal polarizer is shown. In this particular embodiment, the amount of phase shift imparted by the first phase retardation structure is $\pi/2$ radians at the central wavelength $\lambda_C$, the amount of phase shift imparted by the second phase retardation structure is $\pi$ radians at the central wavelength $\lambda_C$, the cholesterically ordered molecules throughout the bulk of the polarizer have a LHC ordering, and the incident light is produced from an unpolarized light source located on either side of the liquid crystal polarizer. The set of mathematical expressions in FIG. 8A2 describe the behavior of the liquid crystal polarizer of FIG. 8A1 in response to incident light produced from an unpolarized light source located on either side of the liquid crystal polarizer. LHCP and linearly polarized light can be produced by directing an unpolarized light source towards the liquid crystal polarizer. LHCP and linearly polarized light can be produced by directing an unpolarized light source towards the liquid crystal polarizer.

In FIG. 8B1, a twenty-first illustrative embodiment of the liquid crystal polarizer is shown. In this particular embodiment, the amount of phase shift imparted by the first phase retardation structure is $\pi/2$ radians at the central wavelength $\lambda_C$, the amount of phase shift imparted by the second phase retardation structure is $\pi$ radians at the central wavelength $\lambda_C$, the cholesterically ordered molecules throughout the bulk of the polarizer have a RHC ordering, and the incident light is produced from an unpolarized light source located on either side of the liquid crystal polarizer. The set of mathematical expressions in FIG. 8B2 describe the behavior of the liquid crystal polarizer of FIG. 8B1 in response to incident light produced from an unpolarized light source located on either side of the liquid crystal polarizer. RHCP and linearly polarized light can be produced by directing an unpolarized light source towards the liquid crystal polarizer.

In FIG. 8C1, a twenty-second illustrative embodiment of the liquid crystal polarizer is shown. In this particular embodiment, the amount of phase shift imparted by the first phase retardation structure is $\pi/2$ radians at the central wavelength $\lambda_C$, the amount of phase shift imparted by the second phase retardation structure is $\pi$ radians at the central wavelength $\lambda_C$ the cholesterically ordered molecules throughout the bulk of the polarizer have a LHC ordering, and the incident light is produced from a LHCP light source located on either side of the liquid crystal polarizer. The set of mathematical expressions in FIG. 8C2 describe the behavior of the liquid crystal polarizer of FIG. 8C1 in response to incident light produced from a LHCP light source located on either side of the liquid crystal polarizer. Linearly polarized light or LHCP light can be produced by directing LHCP light towards the liquid crystal polarizer.

In FIG. 8D1, a twenty-third illustrative embodiment of the liquid crystal polarizer is shown. In this particular embodiment, the amount of phase shift imparted by the first phase retardation structure is $\pi/2$ radians at the central wavelength $\lambda_C$ the amount of phase shift imparted by the second phase retardation structure is $\pi$ radians at the central wavelength $\lambda_C$, the cholesterically ordered molecules throughout the bulk of the polarizer have a RHC ordering, and the incident light is produced from a RHCP light source located on either side of the liquid crystal polarizer. The set of mathematical expressions in FIG. 8D2 describe the behavior of the liquid crystal polarizer shown in FIG. 8D1 in response to incident light produced from a RCHCP light source located on either side of the liquid crystal polarizer. RHCP light can be produced by directing a source of LHCP light towards the liquid crystal polarizer.

In FIG. 8E1, a twenty-fourth illustrative embodiment of the liquid crystal polarizer is shown. In this particular embodiment, the amount of phase shift imparted by the first phase retardation structure is $\pi/2$ radians at the central wavelength $\lambda_C$, the amount of phase shift imparted by the second phase retardation structure is $\pi$ radians at the central wavelength $\lambda_C$, the cholesterically ordered molecules throughout the bulk of the polarizer have a LHC ordering, and the incident light is produced from a RHCP light source located on either side of the liquid crystal polarizer. The set of mathematical expressions in FIG. 8E2 describe the behavior of the liquid crystal polarizer of FIG. 8E1 in response to incident light produced from a RHCP light source located on either side of the liquid crystal polarizer. LHCP light can be produced by directing a source of RHCP light towards the liquid crystal polarizer.

In FIG. 8F1, a twenty-five illustrative embodiment of the liquid crystal polarizer is shown. In this particular embodiment, the amount of phase shift imparted by the first phase retardation structure is $\pi/2$ radians at the central wavelength $\lambda_C$, the amount of phase shift imparted by the second phase retardation structure is $\pi$ radians at the central wavelength $\lambda_C$ the cholesterically ordered molecules throughout the bulk of the polarizer have a RHC ordering, and the incident light is produced from RHCP light source located on either side of the liquid crystal polarizer. The set of mathematical expressions FIG. 8F2 describe the behavior of the liquid crystal polarizer of FIG. 8F1 in response to incident light produced from a RHCP light source located on either side of the liquid crystal polarizer. Either linearly polarized light or RHCP light can be produced by directing a source of RHCP light towards the liquid crystal polarizer.

Having described the above illustrative embodiments of the present invention, several modifications readily come to mind.

In particular, the cholesteric liquid crystal linear polarizer of the present invention can be realized in the form of a micropolarization panel for lamination onto a liquid crystal display (LCD) panel as taught in U.S. Pat. No. 5,537,144 issued to Applicant on Jul. 16, 1996, and incorporated herein by reference in its entirety. The function of the micropolarization panel is to produce micropolarized spatially multiplexed images (SMIs) for display in either a direct or projection viewing mode. In general, each micropolarized SMI includes pixels of both left and right perspective images of a 3-D object or scene (of a real and/or synthetic nature), wherein the left image pixels have a first linear (or circular) polarization state P1, whereas the right image pixels have a second linear (or circular) polarization state orthogonal to the first polarization state P2.

In general, there are several ways in which to realize a micropolarization panel according to the principles of the present invention. For purposes of illustration, it will be assumed that: (i) the LCD panel is made from twisted nematic (TN) liquid crystal material and produces linearly polarized light; (ii) first and second sets of phase retardation regions are formed on a CLC film structure by either of the two fabrication techniques described hereinabove; (iii) the first set of phase retardation regions is the logical complement of the second set of phase retardation regions; (iv) the left perspective image pixels of the displayed SMIs spatially correspond to the first set of phase retardation regions; and (v) the second set of phase retardations spatially correspond to the right perspective image pixels of the displayed SMIs.

In a first illustrative embodiment of the present invention, the liquid crystal molecules along the surface of the CLC film structure are reoriented so that (i) the optical axis of each phase retardation region in the first set thereof extends in the same direction as all other phase retardation regions in the first set thereof, and (ii) the optical axis of each phase retardation region in the second set thereof extends in the same direction as all other phase retardation regions in the second set thereof. Also, the depth of surface molecular reorientation in the first set of phase retardation regions is such that the amount of phase retardation imparted by each such phase retardation region is sufficient to impart a first linear polarization state P1 to light transmitted therethrough, whereas the the depth of surface molecular reorientation in the second set of phase retardation regions is such that the amount of phase retardation imparted by each such phase retardation region is sufficient to impart a second linear polarization state P2 to light transmitted therethrough.

In alternative embodiments, different amounts of phase retardation can be imparted by the micropolarization panel in order that the micropolarization panels produce SMIs with left and right image pixels encoded with left-handed and right-handed circularly polarized states, necessitating complementry viewing glasses during sterescopic viewing process. The details for making such alternative embodiments will become apparent in view of the present disclosure and U.S. Pat. No. 5,537,144 issued to Applicant on Jul. 16, 1996, incorporated herein by reference.

Any one or more of the CLC polarizers and/or liquid crystal retardation structures of the present invention (hereinafter "liquid crystal optical elements" or "LCOEs") can also be combined with other types of optical elements, and/or with other LCOEs, in order to form more complex optical elements for use in a diverse range of optical applications. By combining such LCOEs, a large array of optical devices can be designed to carry out various optical functions (e.g. polarization, retardation, modulation of spatial light intensity, etc.) limited only by ones imagination.

There is an alternative method of fabricating the linear CLC polarizer of the present invention. This alternative method contemplates using two layers of the same type of polymerizable (CLC) material. The first step involves formed a patterned or unpatterned phase retardation region in a first layer of polymerizable CLC film material having nematic phase characteristics. Any one of the three phase retardation forming techniques described hereinabove can be used to form the phase retardation regions. Notably, the phase retardation region(s) would be designed to impart a π/2 phase shift so that the resulting CLC optical element functions as a linear polarizer. The second step of the method involves forming a second layer of CLC film having chiral phase characteristics. The third step of the method involves laminating the first and second layers of CLC film material together in order to form a single CLC film structure consisting of the same type of CLC material but having both a circularly polarizing layer as well as one or more phase retardation regions present therein. Notably, by virtue of near perfect matching of the indices of refraction of the first and second CLC layers, this optical structure will exhibit a very high light transmission efficiency, in constrast with the constructions of prior art CLC linear polarizers.

Either of the above-described embodiments of the CLC linear polarizer of the present invention (i.e. single-layer of lamianted construction) can be used to construct the light modulating pixel structures of ultra-high LCD panels of the type described in Applicant's copending application Ser. No. 08/715,314 entitled "High-Brightness Color Liquid Crystal Display Panel Employing Systemic Light Recycling And Methods And Apparatus For Manufacturing The Same" filed Sep. 16, 1996, and incorporated herein by reference in its entirety.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying Claims to Invention.

What is claimed is:

1. A liquid crystal optical element for imparting a predetermined phase-shift to light having wavelengths within a predetermined optical band, comprising:

a liquid crystal film structure having first and second surfaces disposed substantially parallel to each other and embodying liquid crystal molecules between said first and second surfaces; and at least one phase retardation region formed along said first surface of said liquid crystal film structure, where the liquid crystal molecules within said phase retardation region are oriented along a direction and to a surface depth sufficient to impart a predetermined phase shift to said light transmitted therethrough, said phase retardation region having an optical axis specified by the direction and depth of orientation of said liquid crystal molecules within said region.

2. The liquid crystal optical element of claim 1, wherein said phase retardation region comprises a nematic phase region.

3. The liquid crystal optical element of claim 1, wherein said phase retardation region comprises a smectic phase region.

4. The liquid crystal optical element of claim 1, which further comprises a circularly polarizing region disposed between said first and second surfaces of said liquid crystal film structure, wherein the liquid crystal molecules are cholesterically ordered to circularly polarize light transmitted therethrough having a wavelengths within said predetermined optical band.

5. The liquid crystal optical element of claim 4, wherein light transmitted through said first and second surfaces is linearly polarized.

6. The liquid crystal optical element of claim 5, wherein said phase retardation region comprises a nematic phase region.

7. The liquid crystal optical element of claim 5, wherein said phase retardation region comprises a smectic phase region.

8. A liquid crystal linear polarizer for linearly polarizing light having a wavelengths within a predetermined optical band, comprising:

a liquid crystal film structure having first and second surfaces disposed substantially parallel to each other and embodying liquid crystal molecules between said first and second surfaces;

a chiral phase region formed between said first and second surfaces of said liquid crystal film structure, wherein the liquid crystal molecules within said chiral phase region are cholesterically ordered to form a circularly polarzing region, for circularly polarizing light transmitted therethrough having a wavelengths within a predetermined optical band; and at least one nematic phase region formed along said first surface of said liquid crystal film structure, wherein the liquid crystal molecules within said nematic region are oriented along a direction and to a surface depth sufficient to form at least one phase retardation region therein, for imparting a quarter-wave phase shift to said light transmitted therethrough, said phase retardation region having an optical axis specified by the direction and depth of orientation of said liquid crystal molecules within said nematic phase region, and said light transmitted through said first and second surfaces emerging linearly polarized along the direction of said of optical axis.

9. A cholesteric liquid crystal optical element comprising:

a solid-state liquid crystal film structure having first and second principal surfaces, and cholesterically ordered liquid crystal molecules distributed over at least a selected portion of said solid-state liquid crystal film structure, for reflecting light having a first circular polarization state and wavelengh within a predetermined characteristic reflection bandwidth, incident said selected portion of said solid-state film structure, while transmitting either incident light having a second circular polarization state orthogonal to said first circular polarization state or having wavelengths outside said predetermined characteristic reflection bandwidth;

a phase-retardation region integrally formed though said first or second principal surface, having an optical axis and birefringent phase-retardation characteristics for imparting a predetermined amount of phase retardation to a characteristic wavelength of said incident light passing through said phase-retardation region;

wherein said left-handed cholesterically ordered liquid crystal molecules over said phase-retardation region are reoriented along a specified orientation direction to a predetermined depth within said solid-state liquid crystal film structure, said optical axis extends along said specified orientation direction, and said predetermined amount of phase retardation is determined by said predetermined surface depth to which the cholesterically ordered liquid crystal molecules within said phase-retaradation region are reoriented along said specified orientation direction.

10. The cholesteric liquid crystal optical element of claim 9, wherein said first circular polarization state is a left-handed circular polarization state, and said second circular polarization state is a right-handed circular polarization state.

11. The cholesteric liquid crystal optical element of claim 9, wherein said first circular polarization state is a right-handed circular polarization state, and said second circular polarization state is a left-handed circular polarization state.

12. A liquid crystal optical element comprising:

a solid-state liquid crystal film structure having first and second principal surfaces, and cholesterically ordered liquid crystal molecules distributed over at least a selected portion of said solid-state liquid crystal film structure, for reflecting light having a first circular polarization state and wavelengths within a predetermined characteristic reflection bandwidth, incident said selected portion of said solid-state film structure, while transmitting either light having a second circular polarization state orthogonal to said first circular polarization state or having wavelengths within said predetermined characteristic reflection bandwidth;

a phase-retardation region integrally formed though said first or second principal surface, having an optical axis and birefringent phase-retardation characteristics for imparting a predetermined amount of phase retardation to a characteristic wavelength of said incident light passing through said phase-retardation region;

wherein said cholesterically ordered liquid crystal molecules over said phase-retardation region are reoriented along a specified orientation direction to a predetermined depth within said solid-state liquid crystal film structure, said optical axis extends along said specified orientation direction, and said predetermined amount of phase retardation is determined by said predetermined surface depth to which the cholesterically ordered liquid crystal molecules within said phase-retardation region are reoriented along said specified orientation direction.

13. The liquid crystal optical element of claim 12, wherein said first circular polarization state is a left-handed circular polarization state, and said second circular polarization state is a right-handed circular polarization state.

14. The liquid crystal optical element of claim 12, wherein said first circular polarization state is a right-handed circular polarization state, and said second circular polarization state is a left-handed circular polarization state.

15. A solid-state liquid crystal phase retardation structure, comprising:

a solid-state liquid crystal film structure having a first principal surface and said second principal surface disposed substantially parallel to said first principal surface, and liquid crystal molecules distributed between said first and second principal surfaces over at least a selected portion of said solid-state liquid crystal film structure, a plurality of phase-retardation regions integrally formed though said first and/or second principal surfaces, wherein each said phase-retardation region has an optical with said plurality of birefringent phase-retardation regions, respectively, wherein each said linear polarizing region has a linear polarizing direction extending said optical axis of said spatially coincident birefringent phase-retardation region.

16. A cholesteric liquid crystal linear polarizer comprising:

a solid-state liquid crystal film structure having first and second principal surfaces, and left-handed cholesterically ordered liquid crystal molecules distributed over at least a selected portion of said solid-state liquid crystal film structure, for reflecting left-hand circularly polarized light within a predetermined characteristic reflection bandwidth, incident said selected portion of said solid-state film structure, while transmitting either right-hand circularly polarized light or incident light having a wavelength outside within said predetermined characteristic reflection bandwidth;

a quarter-wave phase-retardation region integrally formed though said first or second principal surface, having an optical axis and birefringent phase-retardation characteristics for imparting $\pi/2$ radians phase retardation to a characteristic wavelength of said incident light passing through said phase-retardation region;

wherein said left-handed cholesterically ordered liquid crystal molecules over said phase-retardation region are reoriented along a specified orientation direction to a predetermined depth within said solid-state liquid crystal film structure, said optical axis extends along said specified orientation direction, and said $\pi/2$ radians phase retardation is determined by said predetermined surface depth to which the left-handed cholsesterically ordered liquid crystal molecules within said phase-retaradation region are reoriented along said specified orientation direction, whereby left-handed circularly polarized light within said predetermined characteristic reflection bandwidth, incident said selected portion of said solid-state film structure and passing through quarter-wave phase-retardation region is converted into linearly polarized light as it emanates therefrom.

17. A cholesteric liquid crystal linear polarizer comprising:

a solid-state liquid crystal film structure having first and second principal surfaces, and right-handed cholesterically ordered liquid crystal molecules distributed over at least a selected portion of said solid-state liquid crystal film structure, for reflecting right-hand circularly polarized light within a predetermined characteristic reflection bandwidth, incident said selected portion of said solid-state film structure, while transmitting either left-hand circularly polarized light or incident light having a wavelength outside within said predetermined characteristic reflection bandwidth;

a quarter-wave phase-retardation region integrally formed though said first or second principal surface, having an optical axis and birefringent phase-retardation characteristics for imparting $\pi/2$ radians phase retardation to a characteristic wavelength of said incident light passing through said phase-retardation region;

wherein said right-handed cholesterically ordered liquid crystal molecules over said phase-retardation region are reoriented along a specified orientation direction to a predetermined depth within said solid-state liquid crystal film structure, said optical axis extends along said specified orientation direction, and said $\pi/2$ radians phase retardation is determined by said predetermined surface depth to which the right-handed cholsesterically ordered liquid crystal molecules within said phase-retaradation region are reoriented along said specified orientation direction, whereby right-handed circularly polarized light within said predetermined characteristic reflection bandwidth, incident said selected portion of said solid-state film structure and passing through said quarter-wave phase-retardation region is converted into linearly polarized light as it emanates therefrom.

18. A cholesteric linear polarizer, comprising:

a solid-state liquid crystal film structure having first and second principal surfaces, and cholesterically ordered liquid crystal molecules distributed over a circularly polarizing region of said solid-state liquid crystal film structure, for reflecting circularly polarized light having a predeteremined circular polarization state and a wavelength within a predetermined characteristic reflection bandwidth, incident said selected portion of said solid-state film structure, while transmitting either circularly polarized light having a polarization state different than said predetermined circular polarization state or a wavelength outside within said predetermined characteristic reflection bandwidth;

said predetermined circular polarization state being determined by the direction of cholesteric ordering of said liquid crystal molecules within said circularly polarizing region;

a quarter-wave phase-retardation region integrally formed though said first or second principal surfaces, having an optical axis and birefringent phase-retardation characteristics for imparting $\pi/2$ radians phase retardation to a characteristic wavelength of said incident light passing through said phase-retardation region;

wherein said cholesterically ordered liquid crystal molecules over said quarter-wave phase-retardation region are reoriented along a specified orientation direction to a predetermined depth within said solid-state liquid crystal film structure, said optical axis extends along said specified orientation direction, and said $\pi/2$ radians phase retardation is determined by said predetermined surface depth to which the cholesterically ordered liquid crystal molecules within said phase-retaradation region are reoriented along said specified orientation direction, whereby circularly polarized light having a polarization state different than said predetermined circular polarization state or a wavelength outside said predetermined characteristic reflection bandwidth, incident said circularly polarizing region and passing through said quarter-wave phase-retardation region is converted into linearly polarized light as it emanates therefrom.

19. A liquid crystal micropolarization panel comprising:

a cholesteric liquid crystal film structure having a distribution of liquid crystal molecules, for imparting a predetermined circular polarization state to incident light passing therethrough;

a first plurality of birefringent phase-retardation regions realized in the surface of said cholesteric liquid crystal film structure by orienting the liquid crystal molecules at a first surface depth and along first molecular orientation direction;

a second plurality of birefringent phase-retardation regions sppatially alternating with said first plurality of birefringent phase-retardation regions, and realized in the surface of said cholesteric liquid crystal film structure by orienting the liquid crystal molecules at a second surface depth and along second molecular orientation direction;

wherein each one of said first plurality of birefringent phase-retardation regions and said cholesteric liquid crystal film structure constitute a left image pixel region having a first linear polarization state, and each one of said second plurality of birefringent phase-retardation regions and said cholesteric liquid crystal film structure constitute a right image pixel region having a second linear polarization state, orthogonal to said first linear polarization state.

20. A linear micropolarization panel comprising:

a solid-state cholesteric liquid crystal film structure having first and/or second primary surfaces thereof, for imparting a predetermined circular polarization state to incident light passing therethrough;

a plurality of birefringent phase-retardation regions formed through said first and/or second primary surfaces, each said birefringent phase-retardation region having a distribution of liquid crystal molecules oriented along a specified molecular orientation direction, and an optical axis extending along the direction of said molecular orientation direction; and a plurality of linear polarizing regions spatially coincident with said plurality of birefringent phase-retardation regions, respectively, wherein each said lineal polarizing region has a linear polarizing direction extending said optical axis of sais spatially coincident birefringent phase-retardation region.

\* \* \* \* \*

UNITED STATES PATENT AND TRADEMARK OFFICE
CERTIFICATE OF CORRECTION

PATENT NO : 6,133,980
DATED : October 17, 2000
INVENTOR(S): Sadeg M. Faris

It is certified that error appears in the above-identified patent and that said Letters Patent is hereby corrected as shown below:

On the title page item [73]
Assignee: Reveo, Inc., Elmsford, New York 10523

Signed and Sealed this

Twenty-fourth Day of April, 2001

Attest:

NICHOLAS P. GODICI

Attesting Officer

Acting Director of the United States Patent and Trademark Office